United States Patent
Hashimoto et al.

(10) Patent No.: US 9,436,713 B2
(45) Date of Patent: Sep. 6, 2016

(54) DATABASE ANALYZER AND DATABASE ANALYSIS METHOD

(71) Applicant: Hitachi, Ltd., Tokyo (JP)

(72) Inventors: Yasunori Hashimoto, Tokyo (JP); Ryota Mibe, Tokyo (JP); Kentaro Yoshimura, Tokyo (JP); Hirofumi Danno, Tokyo (JP); Sadahiro Ishikawa, Tokyo (JP); Kiyoshi Yamaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 432 days.

(21) Appl. No.: 14/061,115

(22) Filed: Oct. 23, 2013

(65) Prior Publication Data
US 2014/0122445 A1 May 1, 2014

(30) Foreign Application Priority Data
Oct. 25, 2012 (JP) ................................ 2012-235686

(51) Int. Cl.
*G06F 17/30* (2006.01)

(52) U.S. Cl.
CPC ... *G06F 17/30306* (2013.01); *G06F 17/30292* (2013.01)

(58) Field of Classification Search
CPC .................. G06F 17/30286; G06F 17/30067; G06F 17/30008; G06F 17/30306
USPC ........................................................ 707/690
See application file for complete search history.

(56) References Cited

U.S. PATENT DOCUMENTS

| | | | |
|---|---|---|---|
| 7,702,613 B1* | 4/2010 | Dankenbring | G06F 11/3684 707/687 |
| 2006/0059189 A1* | 3/2006 | Dunki | G06F 11/3672 |
| 2010/0011252 A1* | 1/2010 | Rivoir | G11C 29/56 714/32 |
| 2010/0030801 A1 | 2/2010 | Takayama et al. | |
| 2011/0153575 A1* | 6/2011 | Glasser | G06F 11/3684 707/690 |
| 2013/0139003 A1* | 5/2013 | Patwardhan | G06F 11/3684 714/32 |

FOREIGN PATENT DOCUMENTS

| | | |
|---|---|---|
| CN | 101639859 A | 2/2010 |
| JP | 2001-256076 A | 9/2001 |

OTHER PUBLICATIONS

Stavros, "How to use count and group by at the same select statement", Apr. 27, 2010, Stack Overflow, stackoverflow.com.*

* cited by examiner

*Primary Examiner* — Hosain Alam
*Assistant Examiner* — Robert F May
(74) *Attorney, Agent, or Firm* — Volpe and Koenig, P.C.

(57) ABSTRACT

A database analyzer includes a data sorting unit sorting a data group acquired from an analysis target database based on data values in a table column and storing it as analysis target data in a storage unit; a data pattern creation processing unit creating a group for each data value based on differences between the data values and storing a data pattern in the storage unit; a data pattern judgment processing unit for judging validity of the data pattern; and a data pattern transformation processing unit for reconstructing the data pattern with respect to constituent elements of each group included in the data pattern by transforming each group in accordance with a specified conversion rule for converting the constituent elements, which are conceptually similar to each other, into the same constituent element, and storing it in the storage unit if a negative result is obtained for the validity judgment.

8 Claims, 25 Drawing Sheets

FIG.9

DATA PATTERN TRANSFORMATIONAL RULES

| BEFORE TRANSFORMATION | AFTER TRANSFORMATION | BEFORE TRANSFORMATION | AFTER TRANSFORMATION |
|---|---|---|---|
| a | [a-z] | [a-z] | [a-zA-Z] |
| b | [a-z] | [A-Z] | [a-zA-Z] |
| : | : | [a-zA-Z] | ¥w |
| z | [a-z] | [0-9] | ¥w |
| A | [A-Z] | ¥w | * |
| : | : | ¥W | . |
| Z | [A-Z] | | |
| 0 | [0-9] | | |
| : | : | | |
| 9 | [0-9] | | |
| # | ¥W | | |
| : | : | | |
| - | ¥W | | |
| _ | ¥w | | |

DATABASE ANALYZER AND DATABASE ANALYSIS METHOD

TECHNICAL FIELD

The present invention relates to a database analyzer and a database analysis method and is suited for use in a database analyzer and database analysis method for analyzing data groups retained in a database,

BACKGROUND ART

Recently, databases which retain a large amount of data have been being actively used; however, regarding development of a database, it is necessary to adjust various parameters relating to the database, such as the size of resources to be allocated within the database (tuning of the database). A general method for tuning a database appropriately is to perform a test to impose load on the database by using dummy test data and thereby evaluate the status of the database.

A commercially available test data generation tool can be used to create such test data, but a user needs to set characteristics of data to be generated with respect to, for example, the range of data values and occurrence frequency. In order to do so, it is important to definitely understand what data having what kind of characteristics are stored in an analysis target database.

For example, Patent Literature 1 describes a test data generator for generating dummy test data from data stored in an existing database. The test data generator described in Patent Literature 1 can generate dummy test data which is suited for actual circumstances, by calculating characteristics of the data from the data stored in the existing database, which is actually in operation, and generating necessary test data for a target database to be developed by utilizing the calculated characteristics.

CITATION LIST

Patent Literature

[Patent Literature 1] Japanese Patent Application Laid-Open (Kokai) Publication No. 2001-256076

SUMMARY OF INVENTION

Problems to be Solved by the Invention

Meanwhile, the test data generator described in Patent Literature 1 obtains characteristics of data by focusing attention on the characteristics of the data between table columns with respect to a data group which is an analysis target but cannot obtain table-column-based data characteristics. So, there is a problem of difficulty to generate an appropriate amount of test data which secures exhaustivity, based on data-column-based characteristics.

An explanation will be given below by giving a specific example. For example, if data-column data of data groups in a certain database are divided into three types of data groups, that is, a "null value," "half-size character strings," and "full-size character strings," it can be expected that exhaustivity of a test of the database can be secured by conducting the test by creating test data for respective cases in which the above-mentioned three types of information is handled. However, in a case of the test data generator described in Patent Literature 1, it cannot acquire characteristics of data on a table column basis, so that you have no choice but to select a method of conducting the test by using all pieces of test data generated by the test data generator or conducting the test by using data randomly selected from all the pieces of test data generated by the test data generator. When all the pieces of test data are used under this circumstance, there is a possibility that the test data more than an essentially necessary test amount may be used in order to secure exhaustivity of the test, which results in a problem in terms of test cost and test time efficiency. Moreover, when the randomly-selected data are used, there is a problem of incapability to secure exhaustivity. Specifically speaking, it is difficult for the test data generator described in Patent Literature 1 to generate appropriate test data based on the data-column-based characteristics.

The present invention was devised in consideration of the above-described circumstances and aims at proposing a database analyzer and database analysis method capable of exhaustively analyzing a database and providing a data pattern obtained by classifying data groups of the database in terms of table-column-based characteristics.

Means for Solving the Problems

In order to solve the above-mentioned problems, provided according to the present invention is a database analyzer for analyzing a data group stored in an analysis target database by focusing attention on a designated table column in the data, the database analyzer including: a storage unit storing data; a data sorting unit for sorting a data group acquired from the analysis target database based on data values of the table column and storing it as analysis target data in the storage unit; a data pattern creation processing unit for creating a group for each of the data values based on differences between the data values of the analysis target data and storing a data pattern, which is a collection of the groups, in the storage unit; a data pattern judgment processing unit for judging validity of the data pattern stored in the storage unit based on a first judgment standard; and a data pattern transformation processing unit for transforming and reconstructing the data pattern and storing the reconstructed data pattern in the storage unit if a negative result is obtained for the validity judgment by the data pattern judgment processing unit; wherein the data pattern transformation processing unit reconstructs the data pattern with respect to constituent elements of each group included in the data pattern by transforming each group in accordance with a specified conversion rule for converting the constituent elements, which are conceptually similar to each other, into the same constituent element.

Furthermore, in order to solve the above-mentioned problems, provided according to the present invention is a database analysis method by a database analyzer for analyzing a data group stored in an analysis target database by focusing attention on a designated table column in the data, the database analyzer including a storage unit storing data, the database analysis method including: a data sorting step executed by the data analyzer sorting a data group acquired from the analysis target database based on data values of the table column and storing it as analysis target data in the storage unit; a data pattern creation step executed by the data analyzer creating a group for each of the data values based on differences between the data values of the analysis target data and storing a data pattern, which is a collection of the groups, in the storage unit; a data pattern judgment step executed by the data analyzer judging validity of the data pattern stored in the storage unit based on a first judgment standard; and a data pattern reconstruction step executed, if a negative result is obtained for the validity judgment by the data pattern judgment unit, by the data analyzer reconstructing the data pattern with respect to constituent elements of each group included in the data pattern by transforming each group in accordance with a specified conversion rule for converting the constituent elements, which are conceptually similar to each other, into the same constituent element and storing the reconstructed data pattern in the storage unit.

Advantageous Effects of the Invention

The present invention can exhaustively analyze a database and provide a data pattern obtained by classifying data groups of the database in terms of table-column-based characteristics.

BRIEF DESCRIPTION OF DRAWINGS

FIG. 9 is a table illustrating an example of data pattern transformational rules.

DESCRIPTION OF EMBODIMENTS (1) First Embodiment

A database analyzer according to a first embodiment is characterized in that it classifies data groups of a database by analyzing the database by focusing attention on a designated table column and creates and outputs a data pattern obtained by classifying the data groups of the database in terms of table-column-based characteristics.

(1-1) Configuration of Database Analyzer

Figure 1:
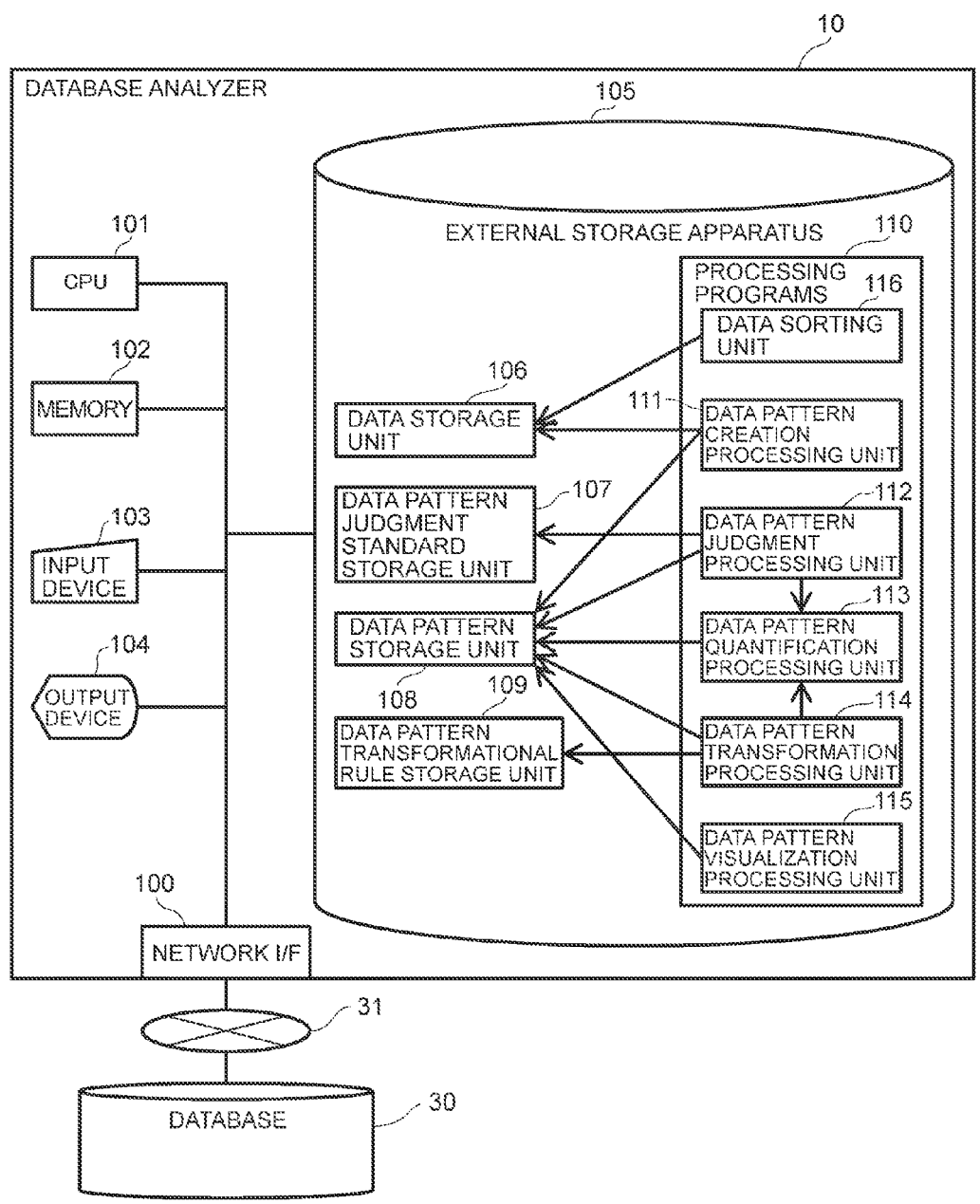
FIG. 1 is a block diagram illustrating a configuration example of a database analyzer according to a first embodiment.

The configuration of a database analyzer according to this embodiment will be firstly explained. FIG. 1 is a block diagram illustrating a configuration example of a database analyzer according to the first embodiment. A database analyzer 10 is connected via a network 31 to a database 30 storing data which is to be an analysis target; and, for example, a computer having a general configuration can be used as the database analyzer 10. The database analyzer 10 is configured by including a network interface (I/F) 100, a CPU (Central Processing Unit) 101, a memory 102, an input device 103, an output device 104, and an external storage apparatus 105 as shown in FIG. 1.

The network I/F 100 is an interface connect to outside of the database analyzer 10 via the network 31 in a manner capable of communicating with outside of the database analyzer 10 and input/output data and send/receive signals to/from outside of the database analyzer 10. For example, data stored in the database 30 are input to the database analyzer 10 via the network 31 and the network I/F 100.

The CPU 101 controls the entire database analyzer 10. For example, when executing processing programs 110 retained in the external storage apparatus 105, the CPU 101 reads the processing programs 110, which have been read from the external storage apparatus 105, to the memory 102 and executes the processing programs 110 which have been read to the memory 102. The memory 102 is a storage device for temporarily storing data and programs and, for example, a DRAM (Dynamic Random Access Memory) or an SRAM (Static RAM) can be used as the memory 102.

The input device 103 is an input device such as a keyboard or a mouse and sends signals according to input operation by a user to the CPU 101. For example, if the user performs a specified input operation on the input device 103, data retained in the database 30 are input to the database analyzer 10 via the network 31 and the input I/F 100 and written to the external storage apparatus 105 under control of the CPU 101 which received the signals according to the input operation.

The output device 104 is an output device such as a display or a printer and outputs data and signals under control of the CPU 101. For example, after database analysis processing described later, the output device 104 displays an image, which shows database analysis results, on the display or outputs text data indicating the database analysis results from the printer under control of the CPU 101. Moreover, when outputting the database analysis results to external equipment connected to the database analyzer 10, the CPU 101 may have the external equipment output the database analysis results via the network I/F 100.

The external storage apparatus 105 is a storage device storing data and programs inside and, for example, an HDD (Hard Disk Drive) or a CD-R (Compact Disc Recordable) may be used as the external storage apparatus 105. Incidentally, an auxiliary storage device, such as a USB (Universal Serial Bus) memory, which is connected to the database analyzer 10 may be used instead of the external storage apparatus 105. The external, storage apparatus 105 retains the processing programs 110 for executing processing for analyzing the database as shown in FIG. 1. Moreover, the external storage apparatus 105 includes respective storage units of a data storage unit 106, a data pattern judgment standard storage unit 107, a data pattern storage unit 108, and a data pattern transformational rule, storage unit 109.

The data storage unit 106 stores data which are input via the network I/F 100 from outside. For example, referring to FIG. 1, data of the database 30 are stored in the data storage unit 106. Moreover, the data pattern storage unit 108 stores data patterns which are information indicating a method for grouping data groups retained in the analysis target database. As a result of execution of the processing programs 110, data patterns for the data groups stored in the data storage unit 106 are created and stored in the data pattern storage unit 108.

Furthermore, the data pattern judgment standard storage unit 107 retains data indicating data pattern judgment standards in advance and the data pattern transformational rule storage unit 109 stores data indicating data pattern transformational rules in advance. The details of the data patterns, the data pattern judgment standards, and the data pattern transformational rules will be explained in relation to database analysis processing described later.

The processing programs 110 are programs for implementing a data pattern creation processing unit 111, a data pattern judgment processing unit 112, a data pattern quantification processing unit 113, a data pattern transformation processing unit 114, a data pattern visualization processing unit 115, and a data sorting unit 116 when the CPU 101 reads the processing programs 110 to the memory 102 and executes them.

The data pattern creation processing unit 111 creates an initial data pattern by referring to data stored in the data storage unit 106 and creating a group based on differences between the data, and writes the initial data pattern to the data pattern storage unit 105. The details of the initial data pattern will be explained later with reference to FIG. 4 to FIG. 6.

The data pattern judgment processing unit 112 performs point rating of a data pattern stored in the data pattern storage unit 108 by using the data pattern quantification processing unit 113 and judges whether adequacy of the data pattern satisfies a necessary standard, based on a data pattern judgment standard read from the data pattern judgment standard storage unit 107. The data pattern quantification processing unit 113 executes processing for quantifying the data pattern by performing point rating according to characteristics of the data pattern.

The data pattern transformation processing unit 114 executes processing for transforming data patterns read from the data pattern storage unit 108 based on data pattern transformational rules read from the data pattern transformational rule storage unit 109. Furthermore, the data pattern transformation processing unit 114 performs point rating of the transformed data patterns by using the data pattern quantification processing unit 113 and writes a data pattern with the highest point to the data pattern storage unit 108.

The data pattern visualization processing unit 115 reads data patterns stored in the data pattern storage unit 108, converts them into a specified format easily recognizable by the user, and outputs the converted data patterns to the output device 104. The specified format to convert data patterns is, for example, an image format, a table format, a graph format, or a text format. Incidentally, the data pattern visualization processing unit 115 may convert data patterns into a specified computer-readable format and output the converted data patterns. In this case, the specified format is, for example, a text data format or a binary data format.

The data sorting unit 116 executes processing for sorting data, which are input to the database analyzer 10, in accordance with specified rules and storing them as analysis target data in the data storage unit 106. Incidentally, the data sorting by the data sorting unit 116 is executed with priority over processing by other processing units 111 to 115 in the processing programs 110.

The database analyzer 10 analyzes characteristics of a data group retained in the database 30 by means of operations by each of the aforementioned processing units 111 to 116 by focusing attention on data values in the same table column, creates a data pattern for grouping the data group according to the characteristics, and classifies the data group according to a finally decided data pattern, thereby analyzing the data group of the database on a table column basis.

(1-2) Database Analysis Processing

Figure 2:
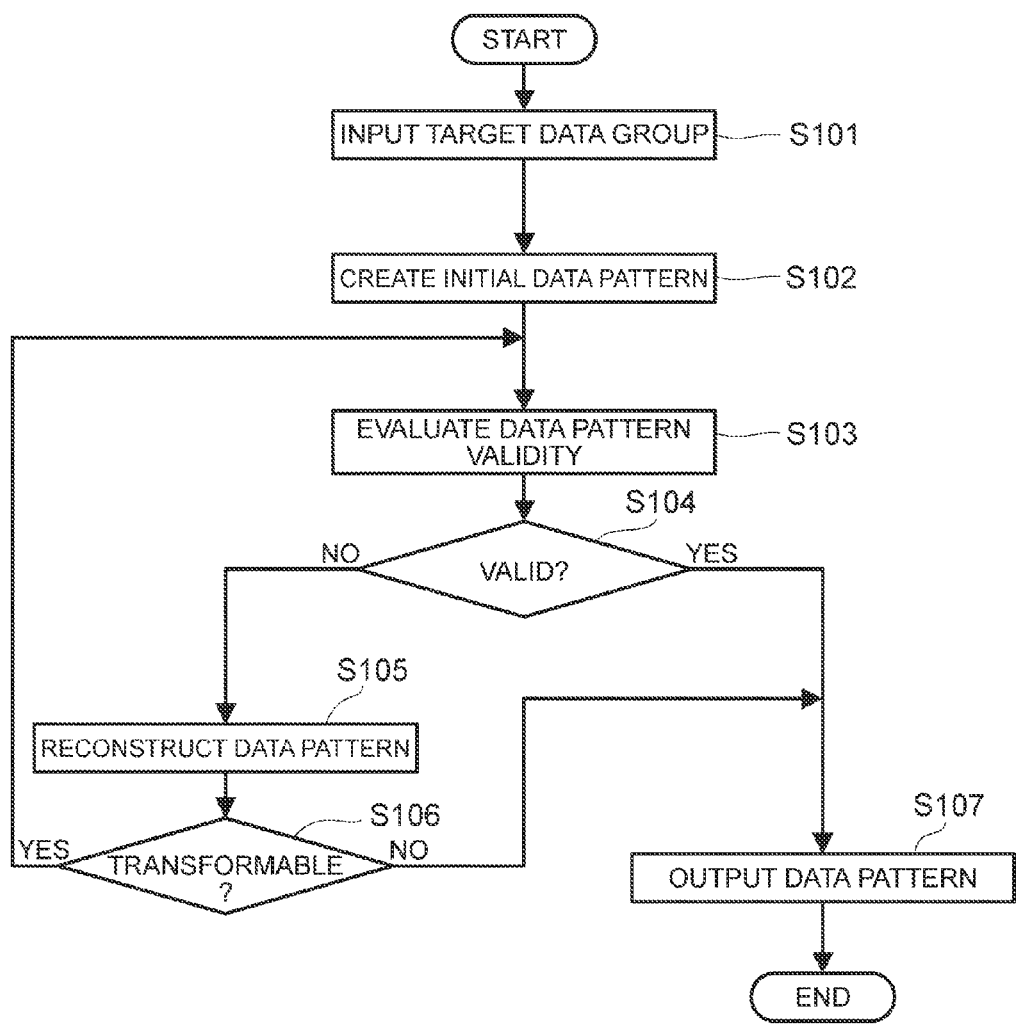
FIG. 2 is a flowchart illustrating a database analysis processing sequence for analyzing data groups of a database.

FIG. 2 is a flowchart illustrating a processing sequence for database analysis processing for analyzing a data group of the database. The outline of the database analysis processing by the database analyzer 10 will be explained with reference to FIG. 2 and its details will be explained with reference to other drawings as necessary.

(1-2-1) Input of Analysis Target Data

When the user firstly performs a specified input operation on the input device 103 to issue an instruction to start analyzing the database, copy data of a data group stored in the database 30 is input via the network 31 and the network I/F 100 to the database analyzer 10 (step S101 in FIG. 2). When the specified input operation to issue the instruction to start analyzing the database is performed, a data group which is an analysis target and a table column on which attention should be focused at the time of analysis (the analysis target column) are designated. This analysis target column is one of columns constituting table data for the data group which is the analysis target and for example, a "product ID" and a "product name" are columns in a "product" table 301 in FIG. 3 described later.

Incidentally, data input from the database 30 to the database analyzer 10 may be all pieces of the copy data of data groups stored in the database 30; however, in consideration of enhancement of processing speeds and efficiency in the use of storage areas, the data input from the database 30 to the database analyzer 10 should preferably be copy data of a data group which is designated as the analysis target among data groups stored in the database 30. The following explanation will be given assuming that the copy data of the data group designated as the analysis target is input to the database analyzer 10.

Then in step S101, the data sorting unit 116 sorts the data input from the database 30 to the database analyzer 10 by focusing attention on the designated analysis target column and stores the data, which are the sorting results, as analysis target data in the data storage unit 106.

Figure 3:
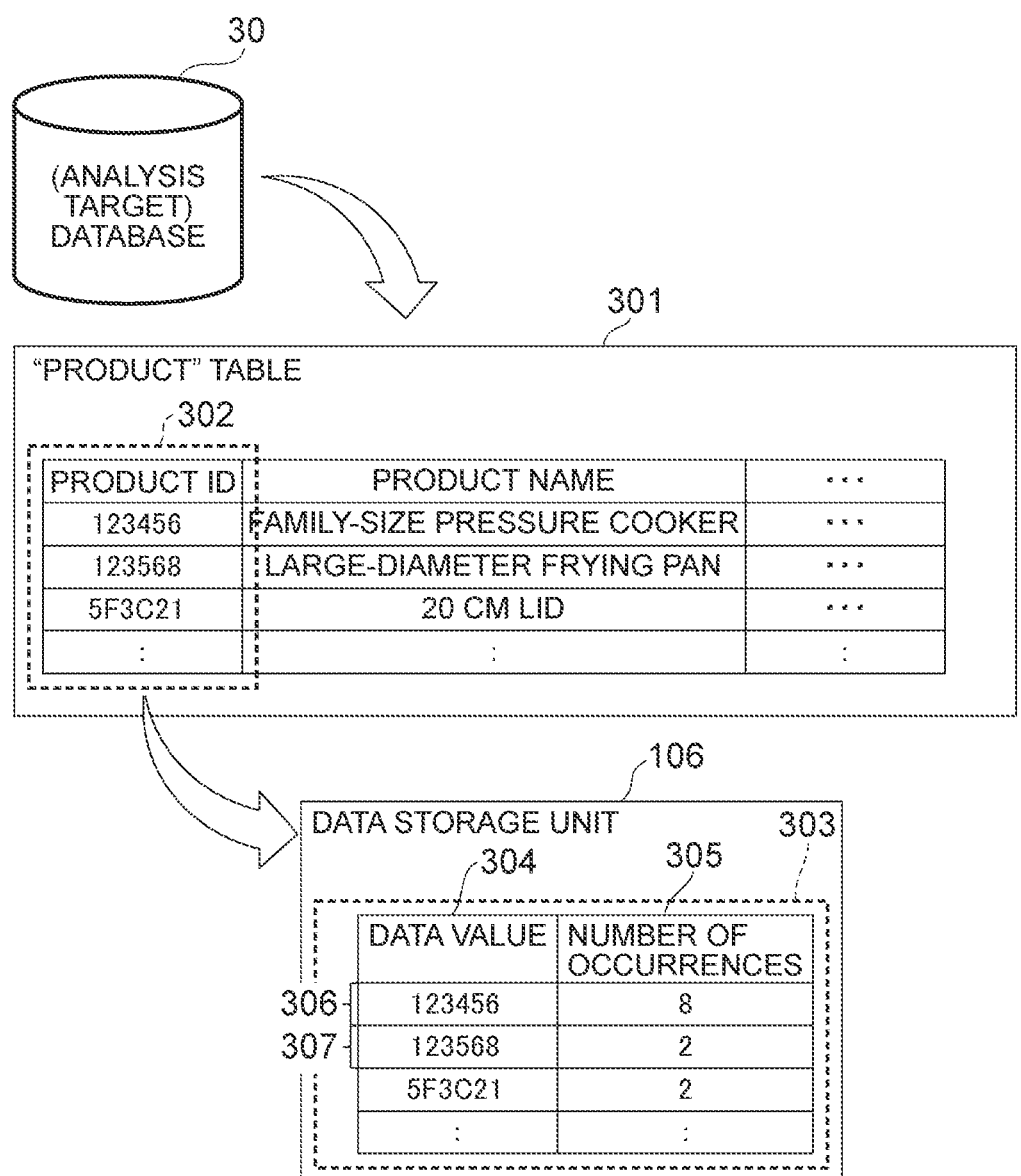
FIG. 3 is a schematic diagram for explaining analysis target data.

FIG. 3 is a schematic diagram for explaining the analysis target data. The "product" table 301 shown in FIG. 3 is part of data groups stored in the database 30 and an example of the data groups designated as analysis targets when the specified input operation is performed to issue the instruction to start the database analysis. The "product" table 301 is table-format data, in which information related to "products" is collected, and is constituted from, for example, a product name column describing a product name and a product ID column 302 describing a product ID assigned corresponding to the relevant product name in advance.

Now, assuming that the product ID 302 is designated as an analysis target column when the specified input operation is performed to issue the instruction to start the database analysis, the data sorting unit 116 sorts data included in the product ID column 302 and stores the data as analysis target data 303 in the data storage unit 106. The data sorting unit 116 counts the number of occurrences of the same data value with respect to the plurality of pieces of data in the product ID column 302 stored in the "product" table 301, Then, the data sorting unit 116 forms a pair of a data value 304 of the product ID and the number of occurrences 305 of the relevant data value 304, thereby creating the analysis target data 303. Regarding the analysis target data 303 shown in FIG. 3, a pair 306 indicates that there are "eight" product IDs having the data value 304 which is "123456"; and a pair 307 indicates that there are "two" product IDs having the data value 304 which is "123568."

Incidentally, when creating the analysis target data 303, the data sorting unit 116 may form pairs of the data value 304 and the number of occurrences 305, but also execute, for example, processing for sorting the data value 304 or the number of occurrences 305 of the product ID in ascending order or sorting processing effective for calculation of data patterns.

Furthermore, the first embodiment explains, as one example, that all pieces of data included in one column are character strings having the same length; however, the character string length of the data included in the column may not be the same. If data composed of character strings with different lengths are included in the column, the data sorting unit 116 may execute processing for dividing the data into data groups for respective character string lengths in advance and then execute processing described later.

(1-2-2) Creation of Initial Data Pattern

After the analysis target data 303 is input to the data storage unit 106 in step S101, the data pattern creation processing unit 111 refers to the analysis target data 303 stored in the data storage unit 106. Then, the data pattern creation processing unit 111 creates groups based on differences between the data from the analysis target data 303, creates a first data pattern (initial data pattern) by putting together the created groups, and writes the created initial data pattern to the data pattern storage unit 108 (step S102 in FIG. 2). The differences between the data herein means differences of the character strings (corresponding to the data value 304) in the column sorted as the analysis target data 303 and the data pattern creation processing unit 111 creates the initial data pattern by forming a tree structure of the character strings for the column with respect to each data value.

Figure 4:
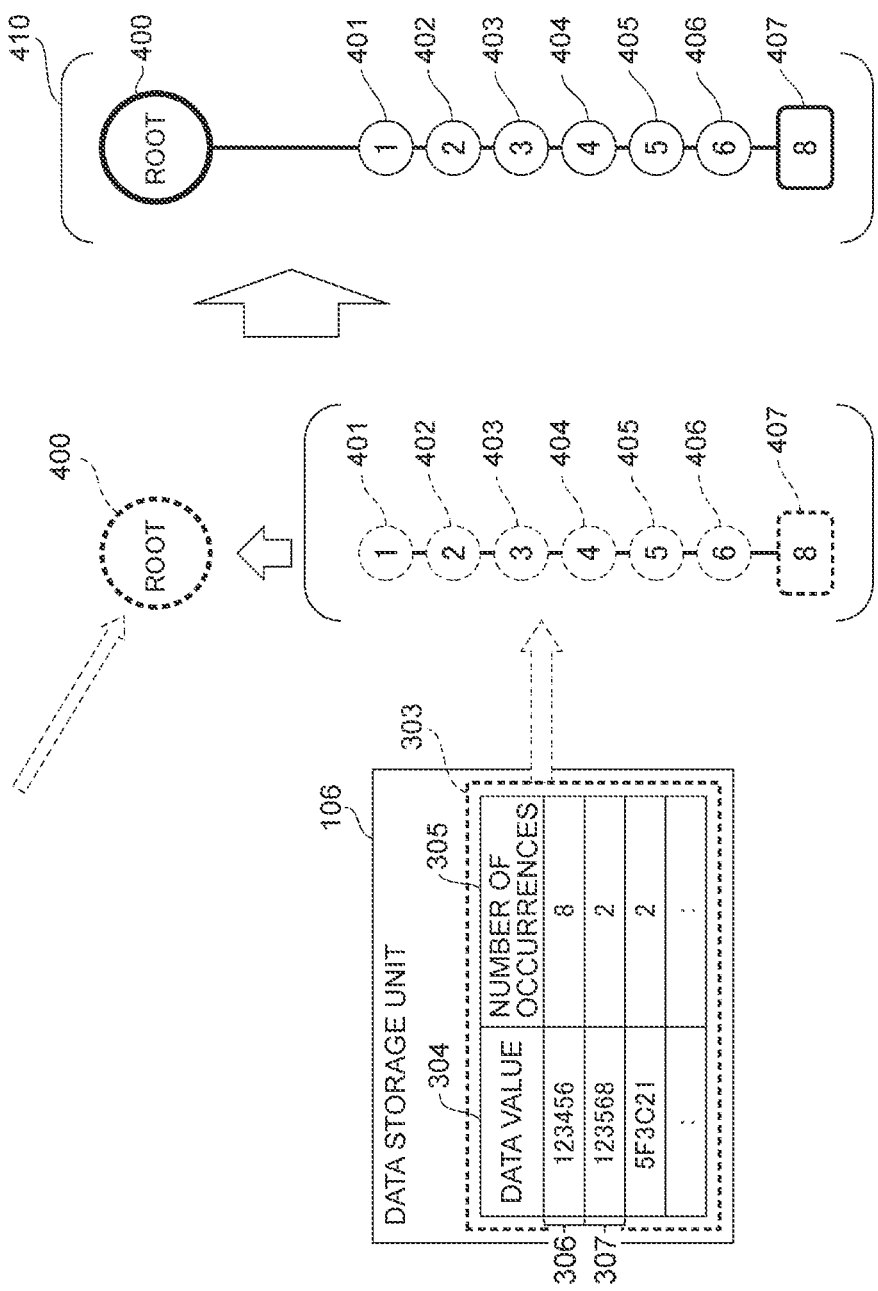
FIG. 4 is schematic diagram (1) for explaining processing for creating an initial data pattern.
Figure 5:
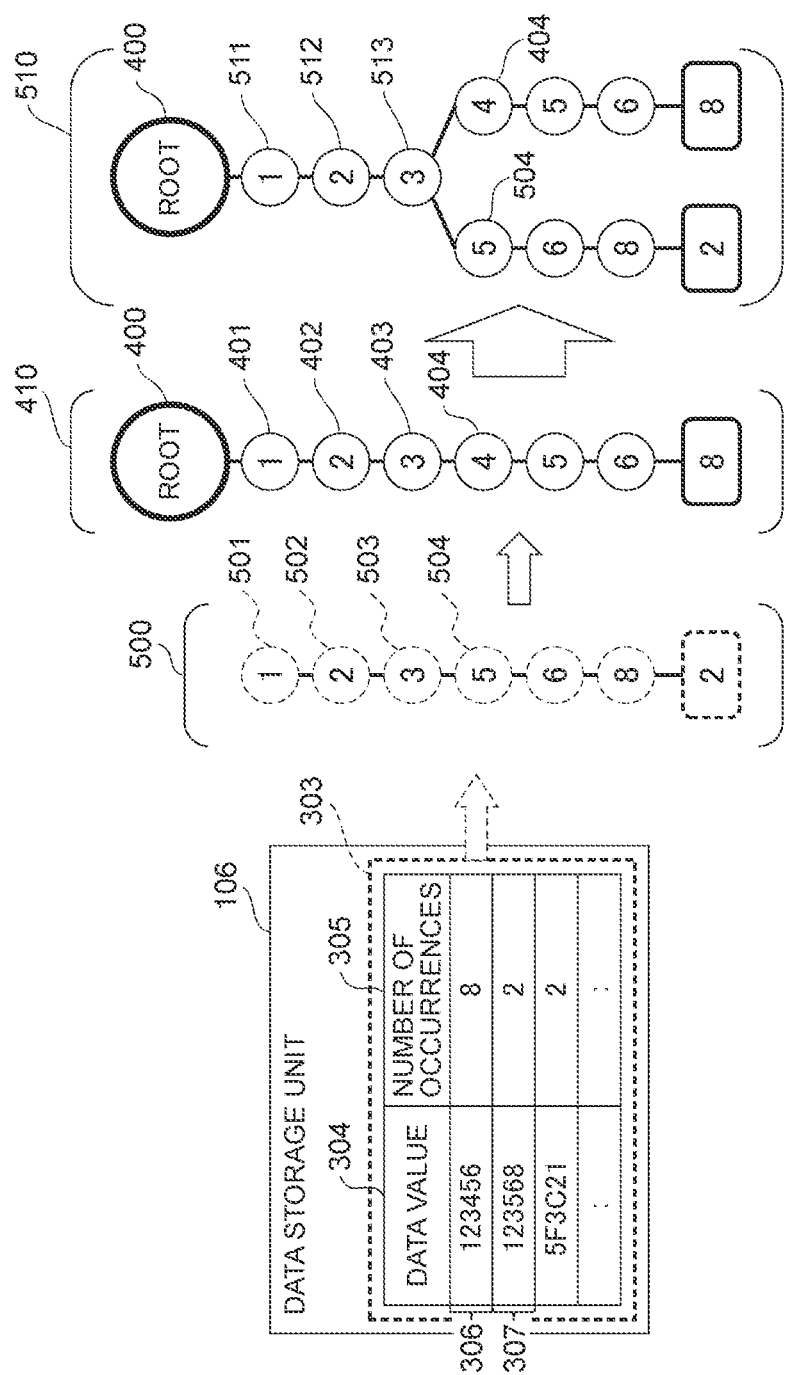
FIG. 5 is schematic diagram (2) for explaining the processing for creating the initial data pattern.
Figure 6:
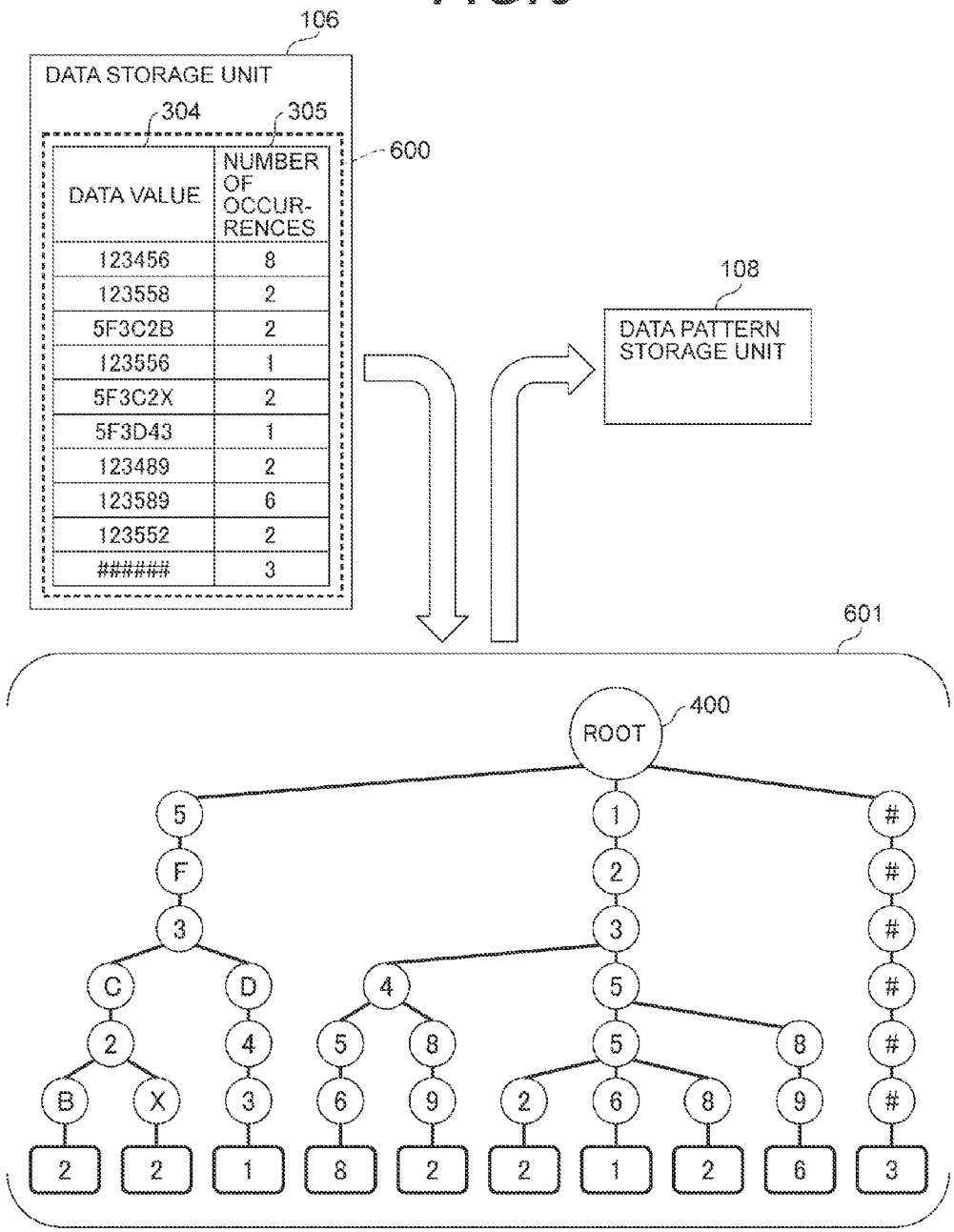
FIG. 6 is schematic diagram (3) for explaining the processing for creating the initial data pattern.

FIG. 4 to FIG. 6 are schematic diagrams for explaining the processing for creating the initial data pattern. Firstly, the data pattern creation processing unit 111 creates a node 400 which becomes a root for a tree as shown in FIG. 4.

Furthermore, the data pattern creation processing unit 111 selects one pair (for example, the pair 306) by referring to the analysis target data 303 stored in the data storage unit 106 and creates a tree corresponding to the selected pair 306. This tree is composed of nodes 401 to 407; is configured to set the node 401, which has a value of a first character of the data value 304 ("1" in the case of the pair 306), as a root and set nodes 402 to 406, each of which has a value of a k-th character (k is a natural number equal to or more than 2) of the data value 304, as children of the nodes 401 to 405, each of which has a value of a (k−1)-th character; and is configured to set the node 407, which has a value of the number of occurrences 305 ("8" in the case of the pair 306), as a child of the node 406 having a value of the last character ("6" in the case of the pair 306) of the data value 304. Next, the data pattern creation processing unit 111 creates a tree 410 by synthesizing the tree by adding the node 401 as a child to the node 400. Therefore, the tree 410 shown in FIG. 4 is a tree created corresponding to the pair 306.

Subsequently, as shown in FIG. 5, the data pattern creation processing unit 111 selects a pair which has not been selected from the analysis target data 303 (for example, the pair 307) and creates a tree 500 corresponding to the selected pair 307 by the same creation method as illustrated in FIG. 4. Then, the data pattern creation processing unit 111 adds a node 501, which is a root for a tree 500, as a child of the node 400 to the created tree 410 having the node 400 as its root, thereby synthesizing the tree 500 with the tree 410. When synthesizing the tree 500 with the tree 410, the data pattern creation processing unit 111 performs the synthesis so that nodes at the same depth of the tree and having the same character as their value become the same node. For example, referring to FIG. 5, the nodes 501, 502, 503 of the tree 500 and the nodes 401, 402, 403 of the tree 410 are at the same depths and have the same characters as their values respectively, so that they become the same nodes (nodes 511 to 513) in the synthesized tree 510.

Next, the data pattern creation processing unit 111 executes processing for creating trees for all pairs of the analysis target data 303 retained in the data storage unit 106 by the method illustrated in FIG. 4 and FIG. 5 and synthesizing them with the tree having the node 400 as its root. FIG. 6 illustrates analysis target data 600 composed of 10 pairs and a tree 601 created based on the analysis target data 600. The tree 601 is a tree formed by synthesizing 10 trees created corresponding to all the pairs of the analysis target data 600 by using the node 400 as its root. The data pattern creation processing unit 111 writes the tree 601 as the initial data pattern based on the analysis target data 600 to the data pattern storage unit 108 at the end of step S102.

(1-2-3) Data Pattern Validity Evaluation

After the initial data pattern (the tree 601) is written to the data pattern storage unit 108 in step S102, the data pattern judgment processing unit 112 evaluates validity of the data pattern retained in the data pattern storage unit 108 (step S103 in FIG. 2). Incidentally, if the processing in step S103 is performed immediately after step S102, the data pattern evaluation unit 112 evaluates the validity of the initial data pattern; and if the processing in step S103 is executed immediately after processing in steps S105 and S106 (described later), the data pattern evaluation unit 112 evaluates the validity of a data pattern reconstructed in the immediately preceding steps S105 and S106.

In step S103, the data pattern judgment processing unit 112 firstly reads the data pattern retained in the data pattern storage unit 108 and performs point rating of the data pattern by using the data pattern quantification processing unit 113.

The data pattern quantification processing unit 113 executes specified processing for quantifying characteristics of the data pattern: and, for example, if the data pattern is the tree 601, the data pattern quantification processing unit 113 calculates the number of groups by counting the number of leaves constituting the tree 601. Since the number of leaves in the tree 601 shown in FIG. 6 is 10, the data pattern is point-rated as "10" as the number of groups.

The data pattern judgment processing unit 112 judges validity of the data pattern which has been point-rated by using the data pattern quantification processing unit 113, to check if the data pattern satisfies appropriate standards based on a specified standard (data pattern evaluation standard) retained in the data pattern evaluation standard storage unit 107.

Figure 7:
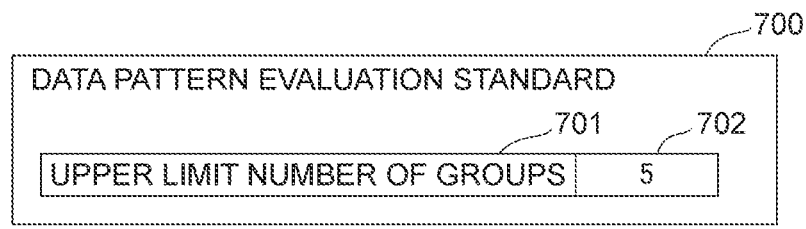
FIG. 7 is a table illustrating an example of a data pattern evaluation standard.

FIG. 7 is a table showing an example of the data pattern evaluation standard. A data pattern evaluation standard 700 is table data for the evaluation standard which is defined in advance and stored in the data pattern evaluation storage unit 107 and is constituted from an evaluation item column 701 describing an evaluation standard item and an item value column 702 describing an item value of the relevant evaluation standard. Regarding the data pattern evaluation standard 700 shown in FIG. 7, the evaluation standard is set as the "upper limit number of groups should be 5 or less," Incidentally, the data pattern evaluation standard is not limited to the upper limit number of groups and may be a standard more specifically defining the range of the number of groups or may be, as another example, a standard defined based on the number of occurrences. In any of such cases, the data pattern quantification processing unit 113 is set to perform point-rating of the data pattern so that the data pattern judgment processing unit 112 can judge the validity of the data pattern based on the data pattern evaluation standard.

Figure 8:
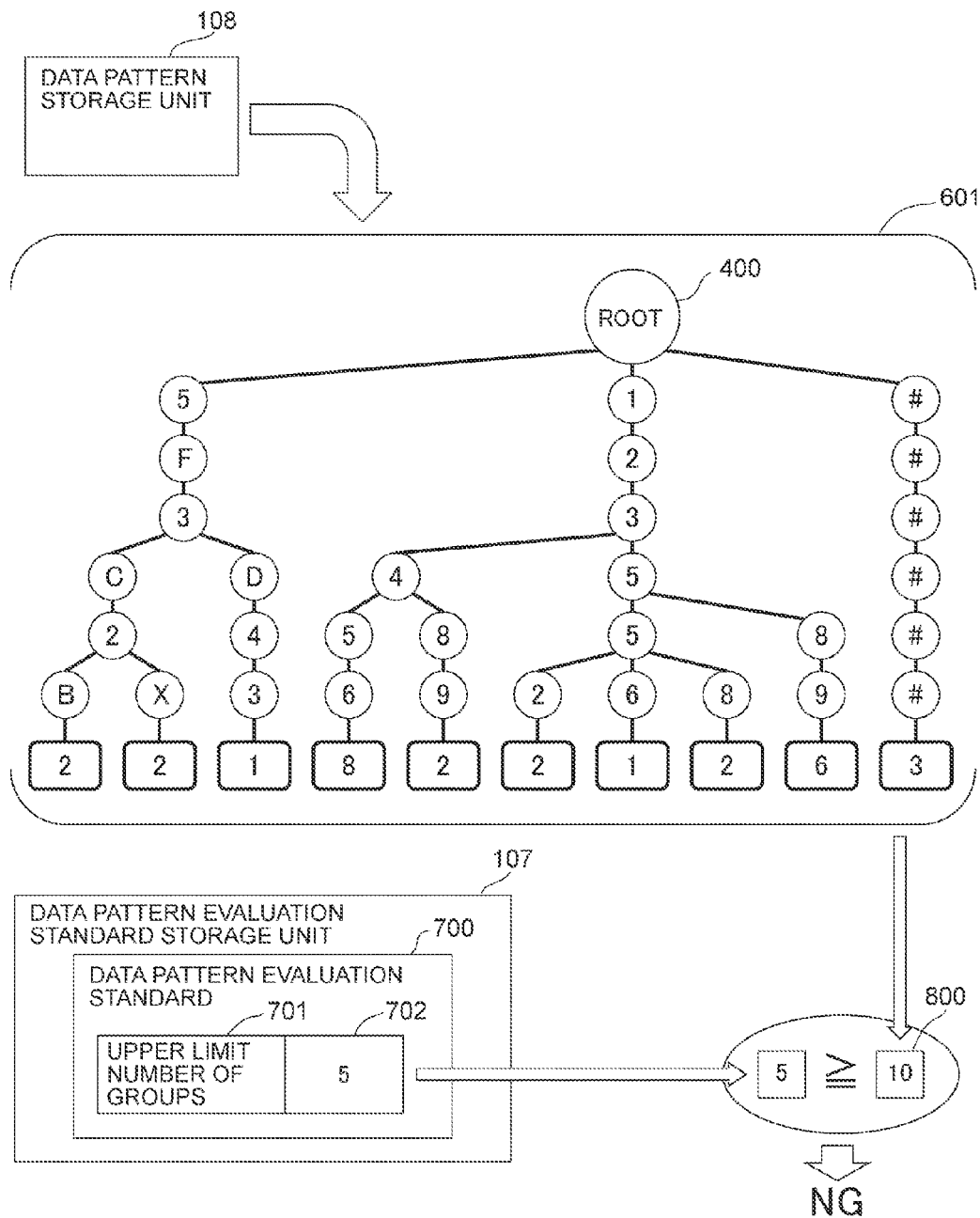
FIG. 8 is a schematic diagram for explaining processing for evaluating validity of a data pattern.

FIG. 8 is a schematic diagram for explaining the processing for evaluating the validity of a data pattern (validity evaluation). FIG. 8 shows the tree 601, which illustrates a data pattern read from the data pattern storage unit 108, and the data pattern evaluation standard 700 retained in the data pattern evaluation standard storage unit 107. When this happens, the data pattern judgment processing unit 112 compares the number of groups 800 calculated by using the data pattern quantification processing unit 113 with "5" which is the upper limit number of groups defined in the item value column 702 of the data pattern evaluation standard 700 (step S104 in FIG. 2). In step S104, the number of groups 800 is the number of groups in the tree 601, that is, "10" which does not satisfy the condition of "5" or less. So, the data pattern judgment processing unit 112 determines that the relevant data pattern is not valid, and then proceeds to processing in step S105. If it is determined in step S104 that the relevant data pattern is valid, the data pattern judgment processing unit 112 proceeds to processing in step S107.

(1-2-4) Reconstruction of Data Pattern

In step S105 of FIG. 2, the data pattern transformation processing unit 114 transforms the data pattern read from the data pattern storage unit 108 with reference to data pattern transformational rules read from the data pattern transformational rules storage unit 109. Furthermore, in step S105, the data pattern transformation processing unit 114 performs point rating of the data pattern after the transformation processing by means of specified processing by using the data pattern quantification processing unit 113, decides a data pattern, which should be a reconstructed data pattern, based on the result of the point rating, and writes the decided data pattern to the data pattern storage unit 108.

FIG. 9 is a table illustrating an example of the data pattern transformational rules. The data pattern transformational rules are information about rules for rewriting data pattern information (node values of nodes constituting the relevant data pattern) for the purpose of the processing for transforming the data pattern by changing data classification retained by the data pattern, and is stored in the data pattern transformational rules storage unit 109 in advance. Data pattern transformational rules 900 shown in FIG. 9 are constituted from pairs of a "before transformation" column 901 describing information (a node value), which is a target to be rewritten, and an "after transformation" column 902 describing information (a node value) after rewriting the information. For example, according to the data pattern transformational rules 900, information "a" is rewritten to [a-z] and information [0-9] is rewritten to "¥w." Incidentally, information that is not described in the before transformation column 901 does not have to be rewritten.

The following explanation will be given below about the processing executed by the data pattern transformation processing unit 114 for transforming the data pattern (the tree 601) shown in FIG. 6 by using the data pattern transformational rules 900 shown in FIG. 9 with reference to FIG. 10 to FIG. 12.

Figure 10:
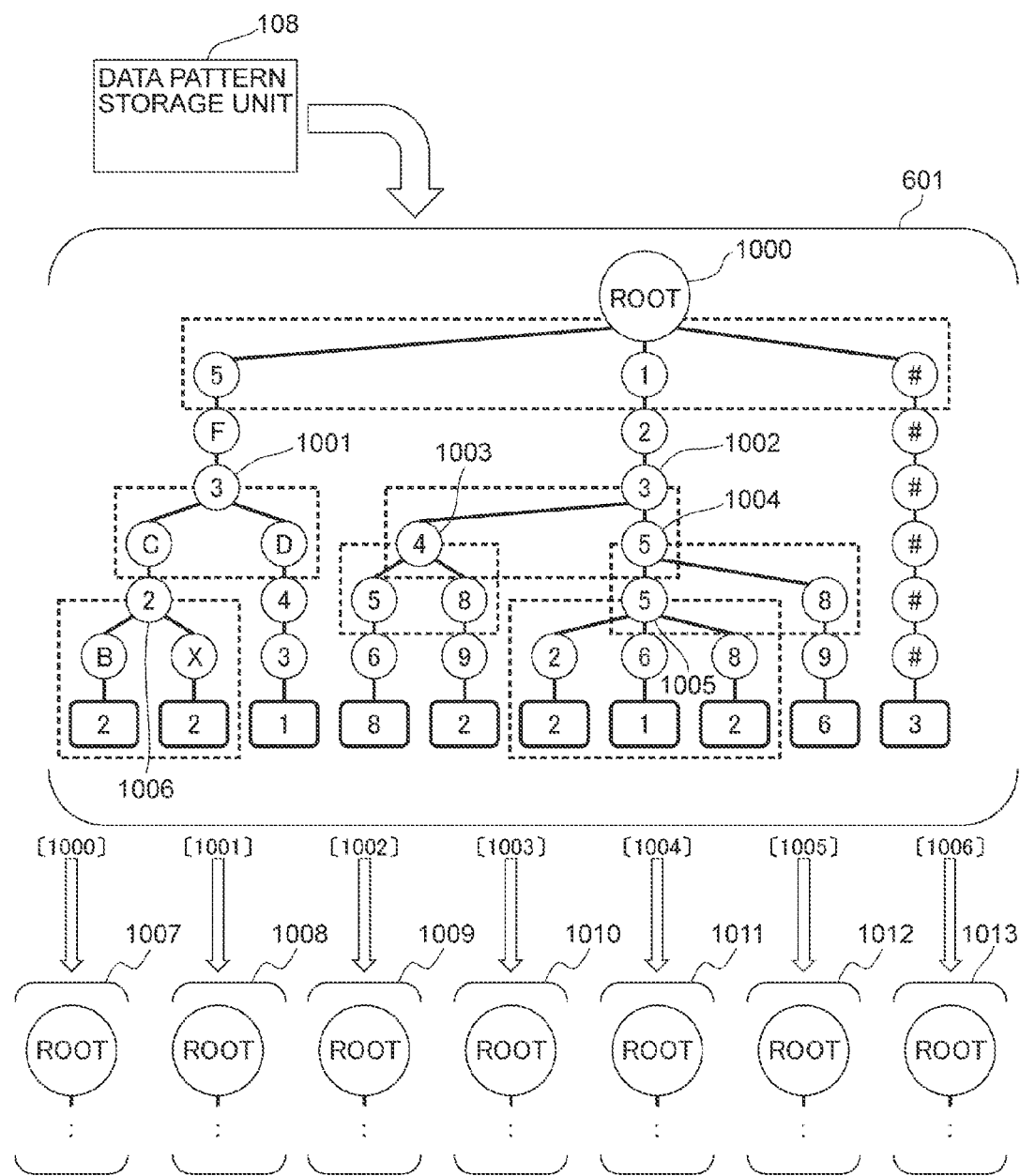
FIG. 10 is schematic diagram (1) for explaining processing for transforming a data pattern.
Figure 11:
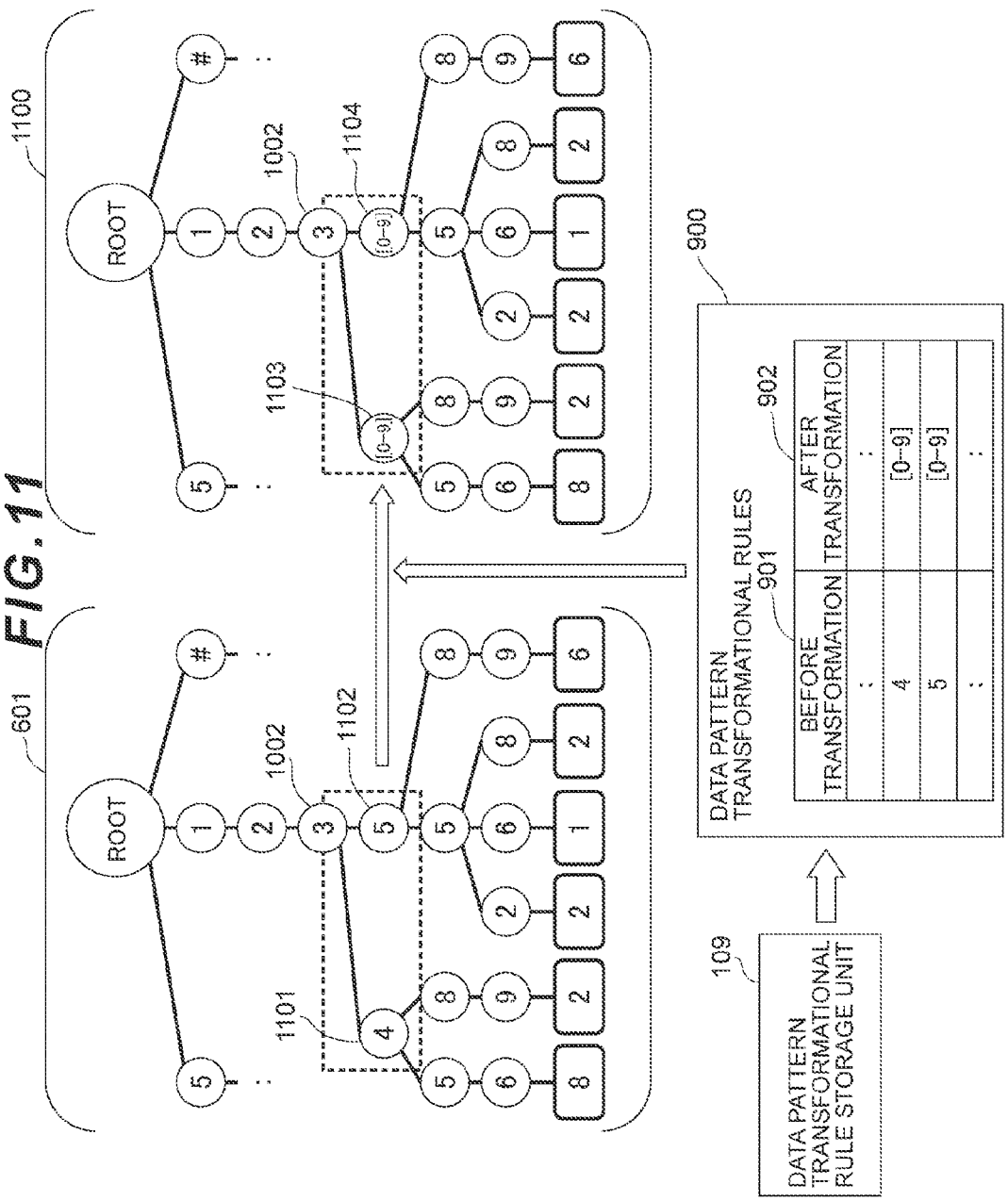
FIG. 11 is schematic diagram (2) for explaining processing for transforming a data pattern.
Figure 12:
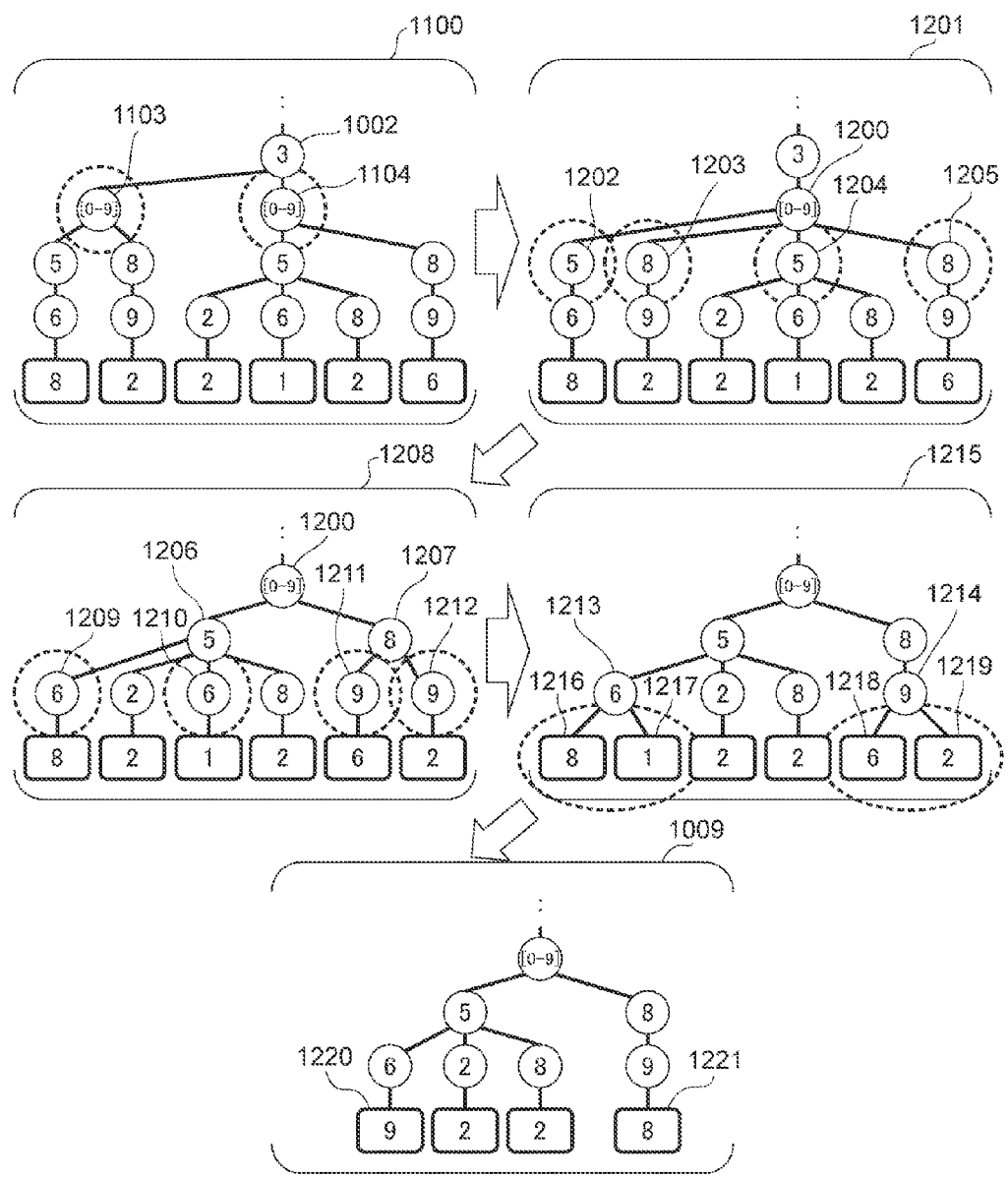
FIG. 12 is schematic diagram (3) for explaining processing for transforming a data pattern.

FIG. 10 to FIG. 12 are schematic diagrams for explaining the processing for transforming the data pattern. Firstly, as shown in FIG. 10, the data pattern transformation processing unit 114 reads the data pattern (the tree 601) from the data pattern storage unit 108 and searches for a node(s) having a plurality of children among nodes constituting the tree 601. The nodes having a plurality of children in the tree 601 in FIG. 10 are nodes 1000 to 1006. For example, the node 1001 has a node with node value "C" and a node with node value "D." Next, the data transformation processing unit 114 executes processing for rewriting children of the relevant node based on the data pattern transformational rules 900 with respect to each of the searched nodes 1000 to 1006 and then creates rewritten trees 1007 to 1013. Incidentally, if there is no node having a plurality of children in the tree 601, the data pattern transformation processing unit 114 determines in step S106 in FIG. 2 that the data pattern cannot be transformed (NO); and then proceeds to processing in step S107.

FIG. 11 and FIG. 12 explain, as an example of the processing for rewriting children of nodes having a plurality of children, processing executed by the data pattern transformation processing unit 114 for rewriting children of the node 1002 in FIG. 10 based on the data pattern transformational rules 900 and creating a tree 1009 as a final form of the data pattern.

The data pattern transformation processing unit 114 firstly creates a data pattern 1100 by copying the data pattern 601 as shown in FIG. 11. When this happens, node values of all children of the node 1002, that is, nodes 1101, 1102 are rewritten in accordance with rewriting rules of the data pattern transformational rules 900. Specifically speaking, the data pattern transformation processing unit 114 rewrites the node 1101 having a node value "4" to a node 1103 having a node value [0-9] and rewrites the node 1102 having a node value "5" to a node 1104 having a node value [0-9].

Next, regarding the tree 1100, the data pattern transformation processing unit 114 puts together the node 1103 and the node 1104, which have the same node values at the same depth and are both children of the node 1002, into one node 1200. When this happens, the tree 1100 is transformed into a tree 1201 shown in FIG. 12. Furthermore, the data pattern transformation processing unit 114 focuses attention on nodes 1202 to 1205, which are children of the synthesized node 1200, puts together a node 1202 and a node 1204, which have the same node value "5," into one node 1206, and puts together a node 1203 and a node 1205, which have the same node value "8," into one node 1207. When this happens, the tree 1201 is transformed into a tree 1208. Furthermore, the data pattern transformation processing unit 114 puts together nodes having the same node value into one node with respect to each of the synthesized nodes 1206, 1207 in the same manner. Specifically speaking, a node 1209 and a node 12010 are synthesized into a node 1213 and a node 1211 and a node 1212 are synthesized into a node 1214. As a result, a tree 1208 is transformed into a tree 1215.

Now, the tree 1215 is in a state where the node transformation processing on the entire character string of the data value 304 has been completed; and regarding the node 1213 and the node 1214, a plurality of nodes indicating the number of occurrences 305 exist as child nodes. Regarding such nodes indicating the number of occurrences 305, the data pattern transformation processing unit 114 does not put together nodes having the same node value into one node as in the case of the nodes indicating the character string of the data value 304, but puts together the relevant nodes into one node by adding the node values of the relevant nodes. Specifically speaking, with respect to nodes 1216, 1217 which are children of the node 1213, the data pattern transformation processing unit 114 puts together the node 1216 having a node value "8" and the node 1217 having a "1" to form a node 1220 having a node value "9." Similarly, with respect to nodes 1218, 1219, which are children of the node 1214, the data pattern transformation processing unit 114 puts together the node 1218 having a node value "6" and the node 1219 having a node value "2" to form a node 1221 having a node value "8." As a result, the tree 1215 becomes a tree 1009, thereby creating a final form of the data pattern by rewriting and transforming the children of the node 1002.

The data pattern transformation processing unit 114 can create the trees 1007 to 1013 representing the data patterns after the transformation processing by executing the transformation processing, which is the same processing as the processing executed on the aforementioned node 1002, on each of the nodes 1000 to 1006 having a plurality of children in the tree 601.

Figure 13:
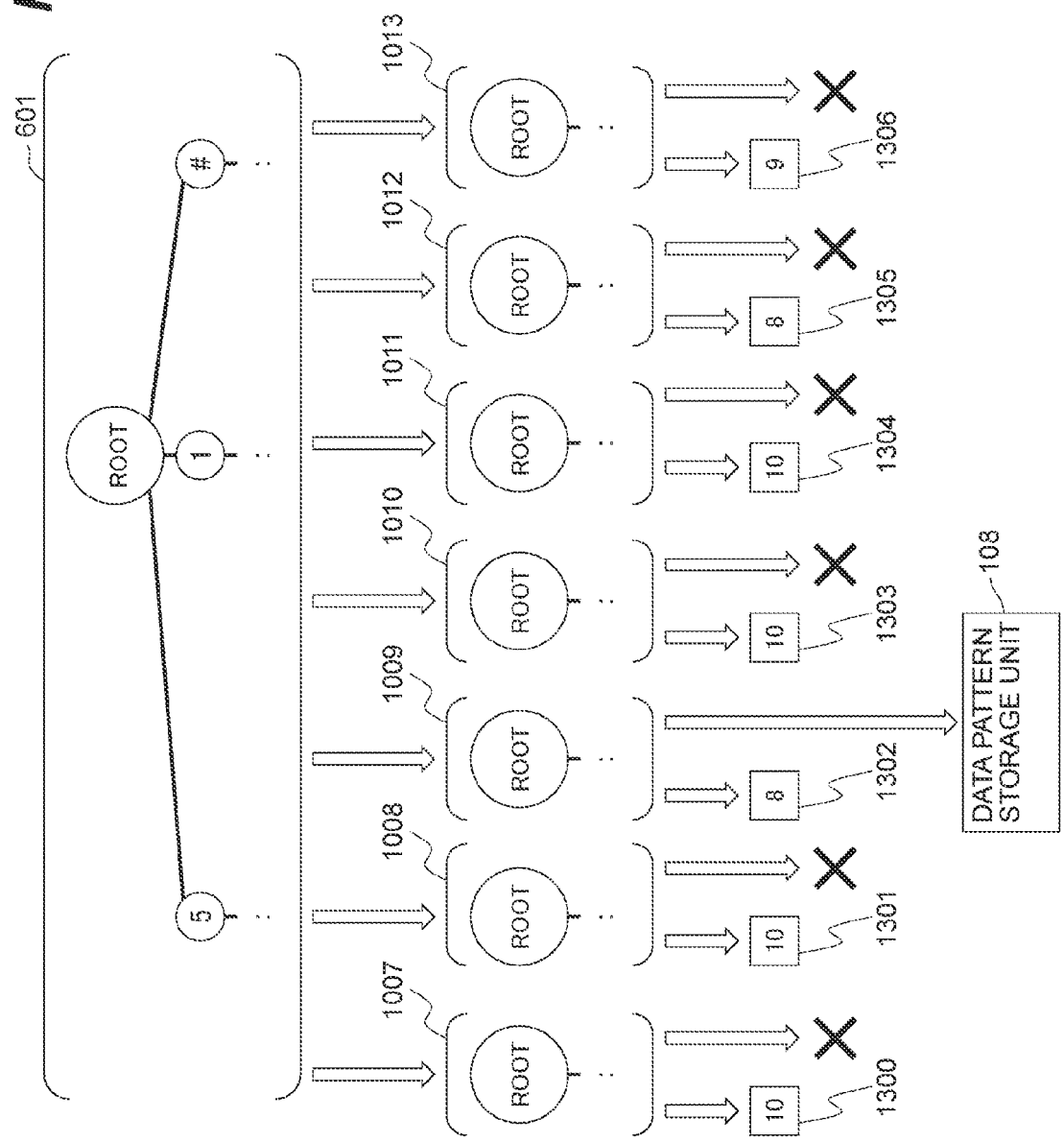
FIG. 13 is a schematic diagram for explaining processing for deciding a reconstructed data pattern from among data patterns after the transformation processing.

FIG. 13 is a schematic diagram for explaining processing for deciding a reconstructed data pattern among the data patterns after the transformation processing. The data pattern transformation processing unit 114 firstly counts the number of leaves of each of the trees 1007 to 1013, which are the data patterns after the transformation processing, by using the data pattern quantification processing unit 113, and thereby calculates the number of groups. FIG. 13 shows the number of groups 1300 to 1306 calculated for each of the trees 1007 to 1013. Next, the data pattern transformation processing unit 114 selects one data pattern with the smallest number of groups from among the number of groups 1300 to 1306. In this example, the data pattern transformation processing unit 114 selects the tree 1009 corresponding to the number of groups 1302 which is "8." Then, the data pattern transformation processing unit 114 decides the selected tree 1009 as a reconstructed data pattern and writes it to the data pattern storage unit 108. Incidentally, if there are a plurality of data patterns corresponding to the smallest number of groups as in the tree 1009 and the tree 1012 in FIG. 13, the data pattern transformation processing unit 114 arbitrarily selects any one of the plurality of data patterns and decides it as the reconstructed data pattern.

Next, in step S106, the data pattern transformation processing unit 114 judges whether the reconstructed data pattern can be transformed or not. Specifically speaking, for example, if a node having a plurality of children exists in the tree 1400 representing the reconstructed data pattern, the data pattern transformation processing unit 114 determines that further transformation is possible, and then returns to the processing in step S103. Moreover, if a node having a plurality of children does not exist in the tree 1400 representing the reconstructed data pattern, the data pattern transformation processing unit 114 determines that further transformation is impossible, and then proceeds to the processing in step S107. Furthermore, if the reconstructed data pattern (the tree 1400) is completely identical to the data pattern (the tree 600) before reconstruction in step S106, the data pattern transformation processing unit 114 determines that the data pattern cannot be transformed, and then proceeds to the processing in step S107.

(1-2-5) Validity Evaluation of Reconstructed Data Pattern

In step S103 after the processing in step S106 in FIG. 2, the data pattern judgment processing unit 112 evaluates data pattern validity of the reconstructed data pattern.

Figure 14:
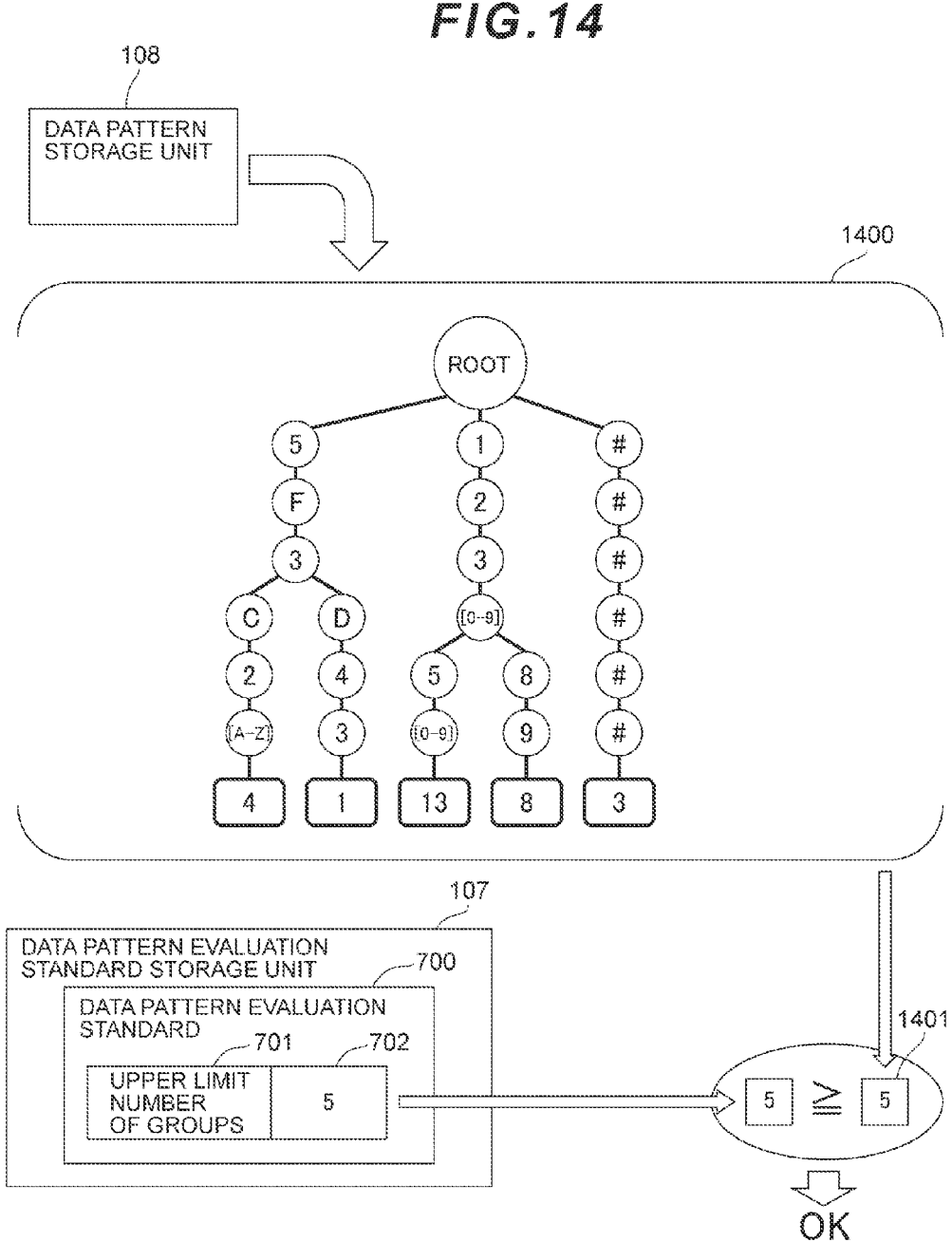
FIG. 14 is a schematic diagram for explaining validity evaluation of the reconstructed data pattern.

FIG. 14 is a schematic diagram for explaining the validity evaluation of the reconstructed data pattern. The validity evaluation of the reconstructed data pattern is performed by the data pattern judgment processing unit 112 in the same manner as the validity evaluation of the aforementioned initial data pattern. Specifically speaking, the data pattern judgment processing unit 112 reads the reconstructed data pattern retained in the data pattern storage unit 108, performs point rating of the reconstructed data pattern by using the data pattern quantification processing unit 113, and judges the validity of the reconstructed data pattern based on the point rating result and the data pattern evaluation standard 700 retained in the data pattern evaluation standard storage unit 107 to check if the reconstructed data pattern satisfies appropriate standards or not.

Referring to FIG. 14, the tree 1400 representing the reconstructed data pattern is point-rated as "5" which is the number of groups 1401. Since the number of groups 1401 satisfies the condition indicated by the data pattern evaluation standard 700, that is, "the upper limit number of groups is 5 or less," the data pattern judgment processing unit 112 determines that the tree 1400 is valid, and then proceeds to the processing in step S107.

(1-2-6) Output of Data Pattern

If the data pattern cannot satisfy the data pattern evaluation standard 700 and a negative judgment is returned in step S103 in FIG. 2 as described above, the data pattern is reconstructed in step S104; and if the reconstructed data pattern can be transformed, the processing for performing the validity evaluation is repeated again in step S103. Then, if an affirmative judgment is returned as the result of the validity evaluation at whichever stage or if a negative judgment is returned as the result of the validity evaluation and then the data pattern is reconstructed, but the data pattern cannot be transformed any further (NO in step S106), the data pattern is output in step S107.

In step S107, the data pattern visualization processing unit 115 reads a data pattern, which is stored last in the data pattern storage unit 108, converts it into a specified format, and outputs it to the output device 104. Incidentally, regarding output of the data pattern in step S107, an output method (an output destination and an output format) may be designated when the user issues the instruction to start analyzing the database to the input device 103 in step S101; and the data pattern may be output to the output device 104 by the relevant output method automatically after the termination of the database analysis processing. Alternatively, output of the data pattern may be executed as triggered by the user's specified input operation to issue the instruction to output the data pattern to the input device 103 after the termination of the database analysis processing. Furthermore, a general output destination such as a display, a printer, or a file may be selected as the output destination of the data pattern and a general output format such as image display by characters and graphics, or text data or binary data may be selected as the output format of the data pattern.

Figure 15:
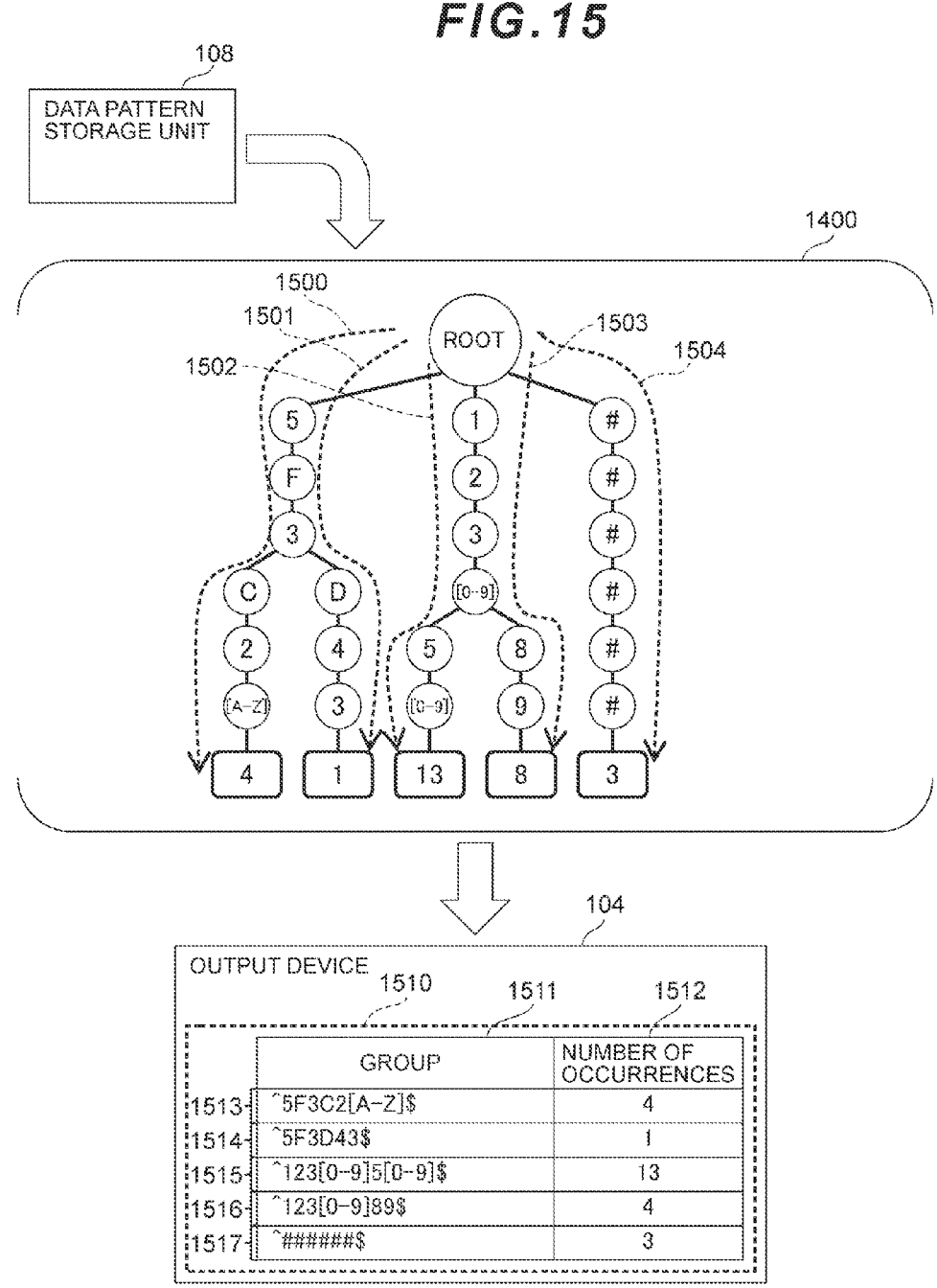
FIG. 15 is a schematic diagram for explaining an example of processing for outputting a data pattern.

FIG. 15 is a schematic diagram for explaining an example of processing for outputting a data pattern. FIG. 15 illustrates processing for aggregating and outputting data patterns to an output table 1510. The output table 1510 is constituted from pairs of a group 1511, which describes a path structure of a tree retained by the data pattern, and the number of occurrences 1512 which describes the number of occurrences of data represented by the relevant path structure.

The data pattern visualization processing unit 115 firstly reads a data pattern which has been stored last, from the data pattern storage unit 108. Therefore, if the data pattern obtained by transforming and reconstructing the initial data pattern is stored, the reconstructed data pattern is read from the data pattern storage unit 108. Next, the data pattern visualization processing unit 115 acquires paths 1500 to 1504 from their roots to leaves from the tree 1400 retained by the read data pattern. Then, the data pattern visualization processing unit 115 defines values of nodes other than the leaves included in the acquired paths 1500 to 1504 as values of the group 1511 in the output table 1510 and defines node values of the leaves as values of the number of occurrences 1512, each of which forms a pair with the relevant group 1510. Regarding to, the group 1511 in the output table 1510 shown in FIG. 15, "^" is attached to the beginning of a character string and "$" is attached to the end of the character string. As a result, for example, a pair 1513 in the output table 1510 indicates that a group represented by a character string "5F3C2 [A-Z]" appears "4" times; and a pair 1514 indicates that a group represented by a character string "5F3D43" appears "once." Then, the data pattern visualization processing unit 115 outputs the output table 1510 to the output device 104 in the output format designated by the user.

(1) Advantageous Effects of This Embodiment

When analyzing a data group retained by the database, such a database analyzer 10 can focus attention on a table column designated by the user, analyze characteristics of the data group based on data values in the same column, and perform grouping (classification) based on the characteristics of the data group. Then, such a database analyzer 10 can indicate, by means of a data pattern, the method of grouping an analysis target data group by focusing attention on the data values in the same column and output the data pattern, it can analyze the database exhaustively and automatically provide data patterns obtained by classifying data groups of the database in terms of the table-column-based characteristics. Consequently, when the user creates test data for the database which is the analysis target, the advantage effect of contributing to the efficient creation of the test data based on the characteristics of the data while securing exhaustivity with respect to data groups in the database can be expected by creating the test data based on the data patterns.

Moreover, such a database analyzer 10 can output data patterns according to various output methods (output destinations and output formats) designated by the user, so that it can provide the data patterns which indicate the characteristics of the analysis target database by a flexible output method in response to the users request such as visually recognizable output or output easily enabling data processing. More specifically, for example, it is possible to output a data pattern as text data or binary data and use the output data without any modification as input data for a tool for generating test data.

Furthermore, when the instruction to start analyzing the database is issued, it is only necessary to designate a data item (a table column or column) on which attention should be focused to extract the characteristics, such a database analyzer 10 does not require the user to have previous knowledge about specific data values and the characteristics of the data group which is the analysis target. Therefore, such a database analyzer 10 can analyze the characteristics of the database, and provide the user with the analysis result as a data pattern without requiring the user to have any previous knowledge about data groups of the database which is the analysis target.

Furthermore, when outputting a data pattern, such a database analyzer 10 can abstract (encode) the output content as shown in the group 1511 of the output table 1510 in FIG. 15 and can expect the advantage effect of making data content of the database hardly recognizable by outsiders by outputting the abstracted content.

(2) Second Embodiment

A database analyzer according to a second embodiment is characterized in that when creating a data pattern representing characteristics of data groups of a database by analyzing the database by focusing attention on a designated table column like the database analyzer 10 according to the first embodiment, a pattern group having an exceptional characteristic, such as low occurrence frequency or an extremely different data structure (character pattern), is removed from data patterns as an exception pattern with respect to pattern groups obtained by classifying the data groups, thereby creating a data pattern in which the characteristics of the data groups are more aggregated.

(2-1) Configuration of Database Analyzer

Figure 16:
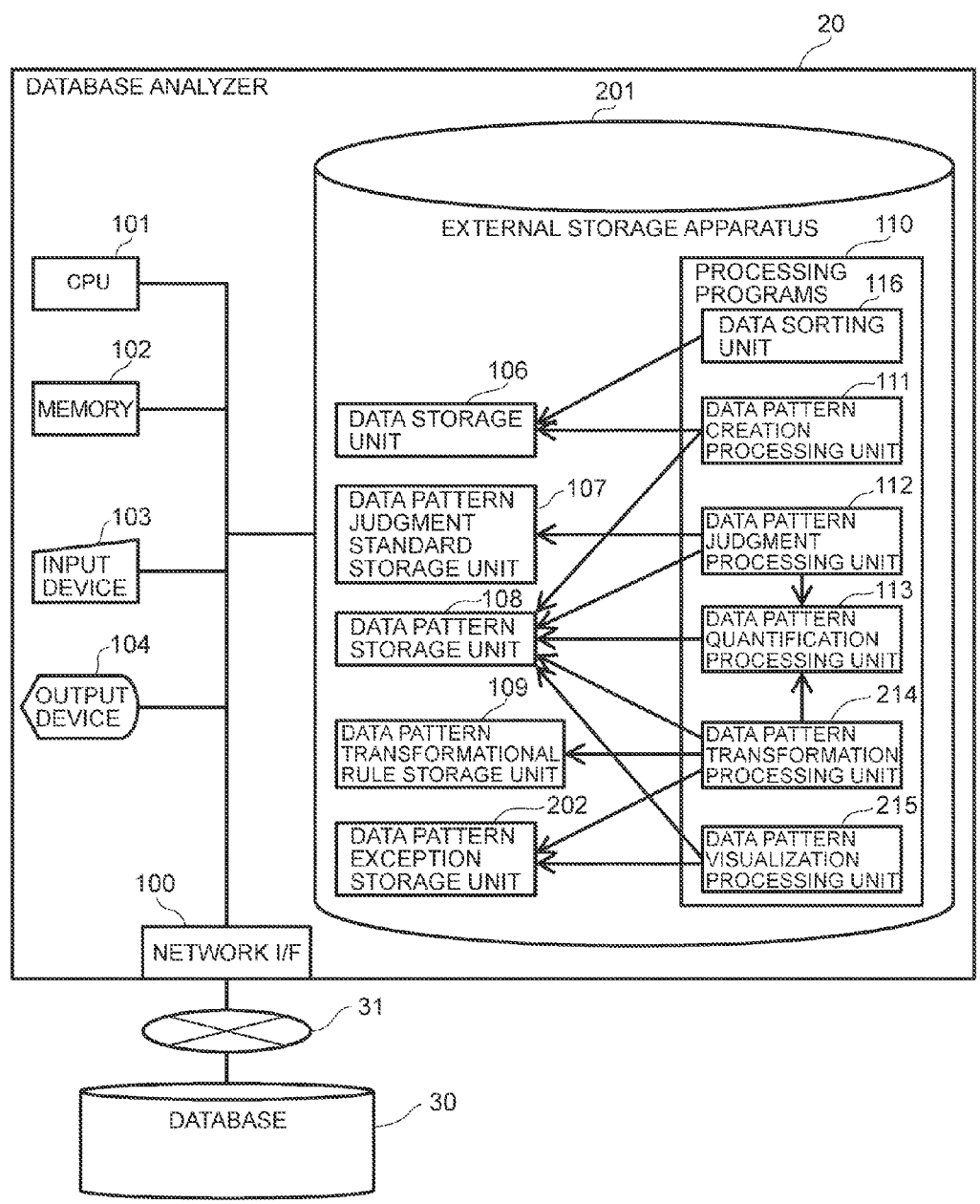
FIG. 16 is a block diagram illustrating a configuration example of a database analyzer according to a second embodiment.

FIG. 16 is a block diagram illustrating a configuration example of a database analyzer according to the second embodiment. As shown in FIG. 16, a database analyzer 20 has the same configuration as that of the database analyzer 10 shown in FIG. 1, except that a data pattern exception storage unit 202 is added to an external storage apparatus 201; and the same reference numerals as those in FIG. 1 are assigned to common constituent elements and any explanation about them is omitted. Moreover, the processing programs 20 includes: a data pattern transformation processing unit 214 which executes different processing from that executed by the data pattern transformation processing unit 114; and a data pattern visualization processing unit 215 which executes different processing from that executed by the data pattern visualization processing unit 115. The processing executed by the data pattern transformation processing unit 214 and the data pattern visualization processing unit 215 will be explained later with reference to FIG. 21 to FIG. 23 and FIG. 25.

(2-2) Database Analysis Processing

Processing executed by the database analyzer 20 according to the second embodiment for analyzing data groups of a database will be explained below with reference to FIG. 2. Since the database analysis processing by the database analyzer 20 proceeds in accordance with the flowchart illustrated in FIG. 2 in the same manner as the processing by the database analyzer 10, any detailed explanation about part in which the same processing as the database analyzer 10 is executed is omitted.

(2-2-1) Input of Analysis Target Data

Firstly, as triggered by a specified input operation performed on the input device 103 in step S101 in FIG. 2 to issue the instruction to start analyzing a database, data groups of a database 30 are input to the database analyzer 20 and the data sorting unit 116 sorts the data groups and writes an analysis target column 303 to the data storage unit 106.

(2-2-2) Creation of Initial Data Pattern

Next, in step S102, the data pattern creation processing unit 111 creates an initial data pattern based on the analysis target data 303 stored in the data storage unit 106 and writes it to the data pattern storage unit 108.

Figure 17:
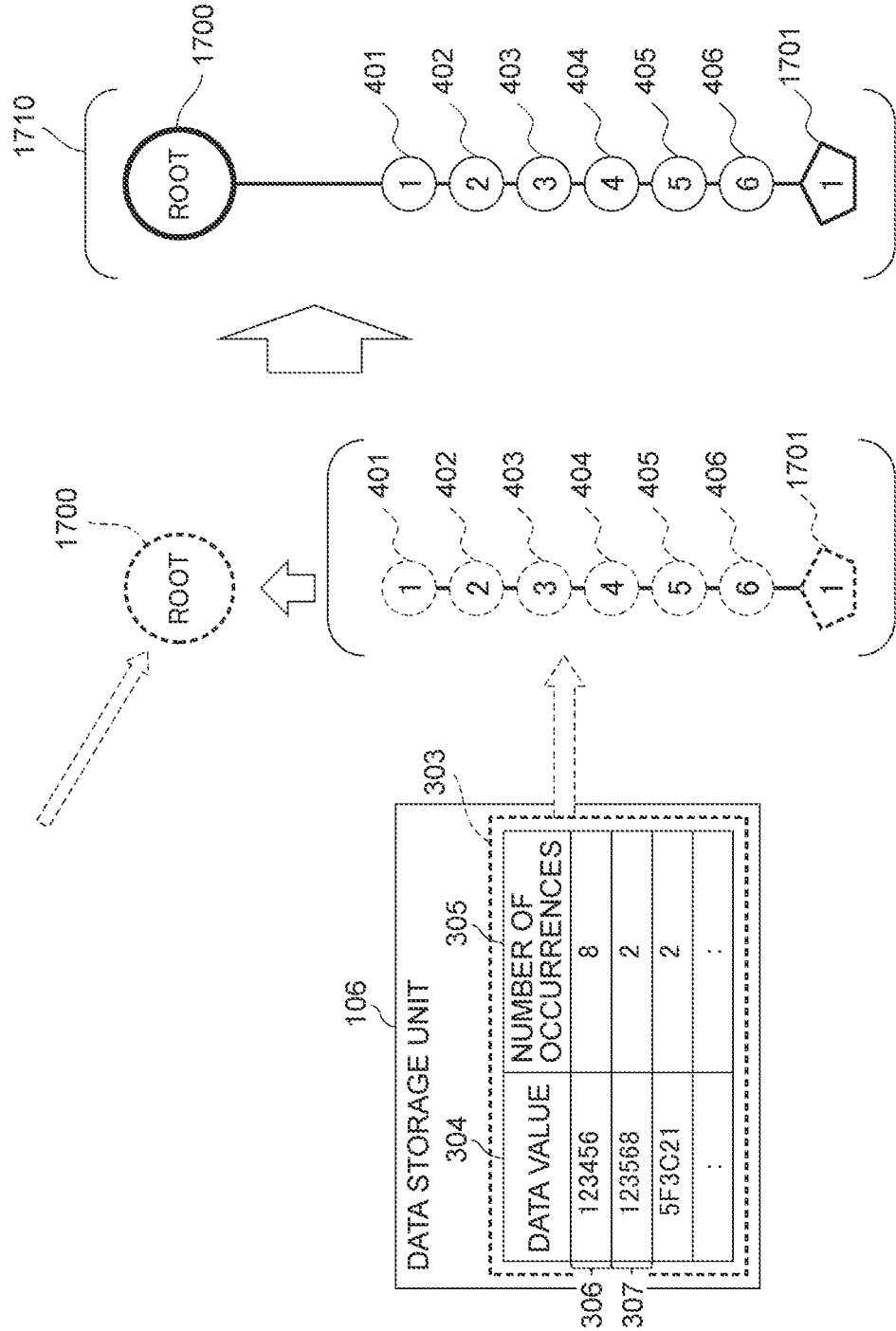
FIG. 17 is schematic diagram (1) for explaining processing for creating an initial data pattern according to the second embodiment.
Figure 18:
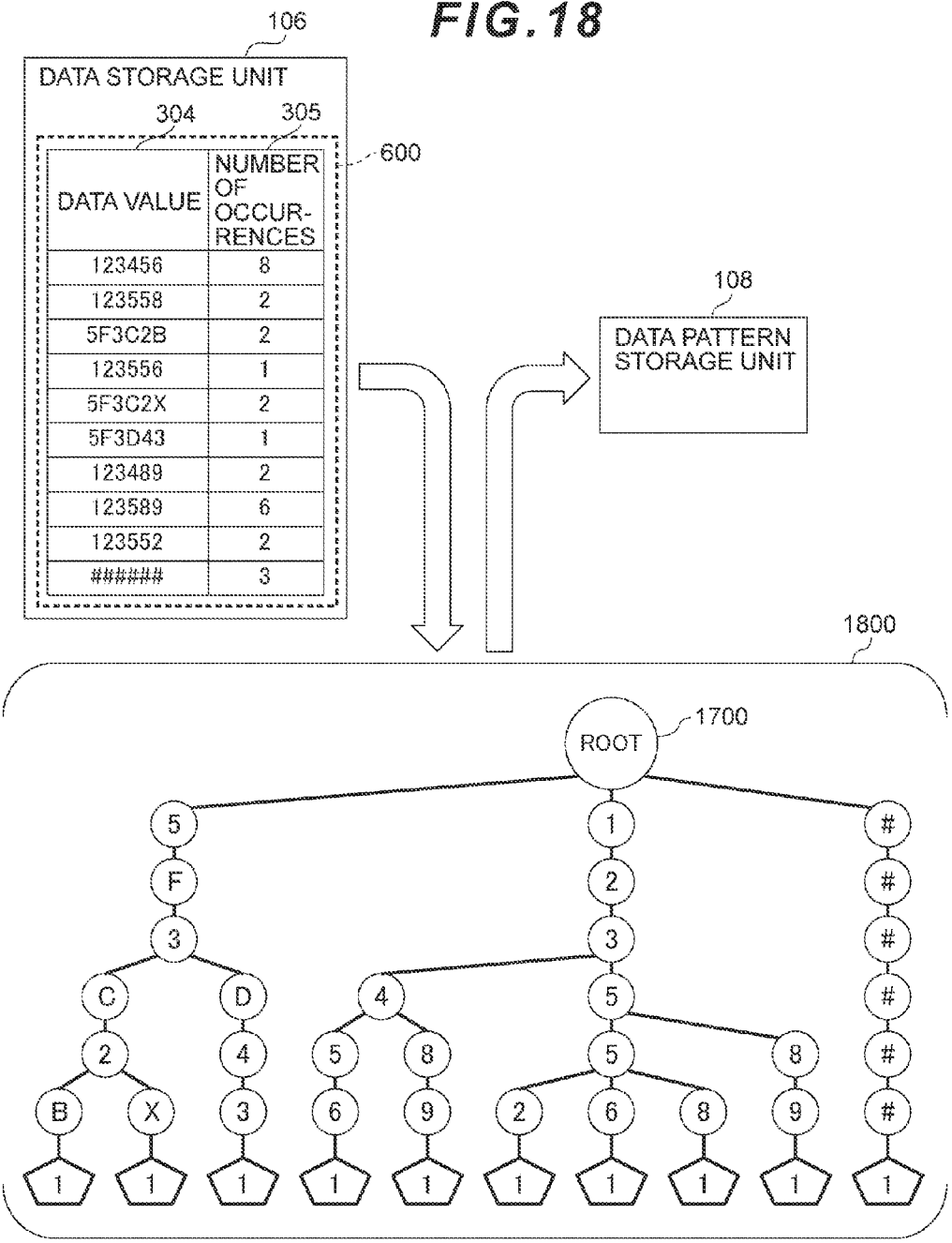
FIG. 18 is schematic diagram (2) for explaining processing for creating the initial data pattern according to the second embodiment.

FIG. 17 and FIG. 18 are schematic diagrams for explaining processing for creating an initial data pattern according to the second embodiment. FIG. 17 illustrates how the data creation processing unit 111 creates a tree 1710 corresponding to a pair 306 of analysis target data 303 with reference to the analysis target data 303 stored in the data storage unit 106. Since a basic processing sequence for creating the tree 1710 is the same as the processing shown in FIG. 4, its explanation has been omitted. However, a leaf node 1701 of the tree 1710 has a value of the number of types of data included in a path (nodes 401 to 406) corresponding to the leaf 1701 instead of a value of the number of occurrences 305. Specifically speaking, since only one type of data (a data value "123456") indicated by the pair 306 is included in the path represented by the nodes 401 to 406 at the stage indicated in FIG. 17, the leaf node 1701 has a node value "1." Furthermore, the data creation processing unit 111 creates trees for all pairs of the analysis target data 303 by executing the same processing as the processing for creating the tree 1701 in FIG. 17 and synthesizes the plurality of created trees into one tree having the node 1700 as its root.

FIG. 18 illustrates a tree 1800 created by the data creation processing unit 111 by creating trees for all pairs of the analysis target data 600 and synthesizing the trees into one tree. Each leaf node of the tree 1800 has a value "1" as the number of types of data. Then, the data creation processing unit 111 writes the tree 1800 as an initial data pattern based on the analysis target data 600 to the data pattern storage unit 108.

(2-2-3) Data Pattern Validity Evaluation

Next, in steps S103 and S104, the data pattern judgment processing unit 112 reads the data pattern (the tree 1800) retained in the data pattern storage unit 108, performs point rating of the data pattern by using the data pattern quantification processing unit 113, and judges validity of the data pattern based on the point rating result and a data pattern evaluation standard 1900 retained in the data pattern evaluation standard storage unit 107 to check whether the data pattern satisfies appropriate standards or not.

Figure 19:
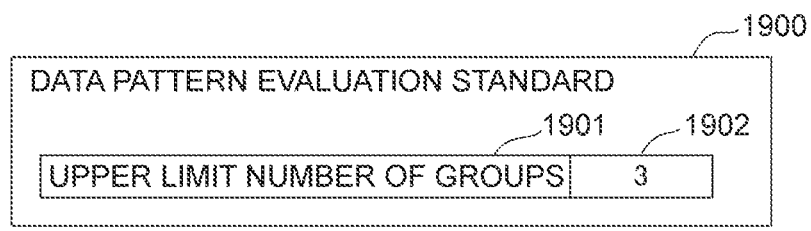
FIG. 19 is a table showing an example of a data pattern evaluation standard according to the second embodiment.

FIG. 19 is a table showing an example of the data pattern evaluation standard according to the second embodiment. With the data pattern evaluation standard 1900 shown in FIG. 19, an "upper limit number of groups" is stored in an evaluation item column 1901 describing an evaluation standard item and "3" is stored in an item value column 1902 describing an item value of the relevant evaluation standard, so that the "upper limit number of groups being 3 or less" is set. Incidentally, the data pattern evaluation standard according to the second embodiment is not limited to the upper limit number of groups as shown in FIG. 19 and may be a standard which defines the range of the number of groups more in detail, or another standard defined based on, for example, the number of occurrences, or a standard based on a rate of occurrence of exception patterns described later (for example, the rate of exception patterns in all data patterns is 5% or less). In any of such cases, the data pattern quantification processing unit 113 is set to perform point rating of the data pattern so that the data pattern judgment processing unit 112 can judge the validity of the data pattern based on the data pattern evaluation standard.

Figure 20:
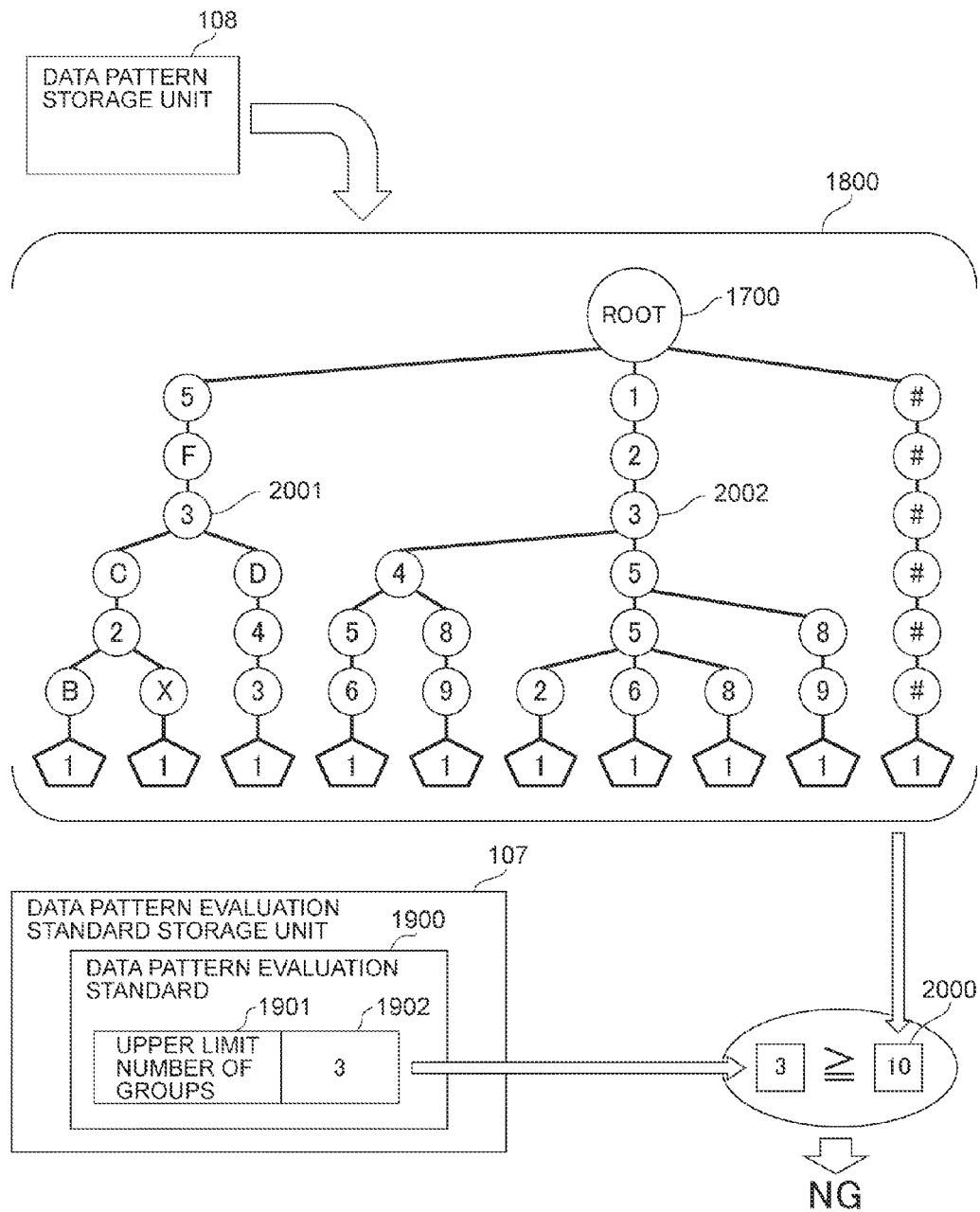
FIG. 20 is a schematic diagram for explaining data pattern validity evaluation according to the second embodiment.

FIG. 20 is a schematic diagram for explaining the data pattern validity evaluation according to the second embodiment. As shown in FIG. 20, the data pattern judgment processing unit 112 reads the tree 1800 as the data pattern retained in the data pattern storage unit 108 and calculates the number of groups 2000 of the tree 1800 by using the data pattern quantification processing unit 113. In this example, the number of groups 2000 of the tree 1800 is "10." The data pattern judgment processing unit 112 compares the number of groups "10" with the data pattern evaluation standard 1900, that is, the "number of groups should be 3 or less" and obtains a judgment result that the data pattern is not valid. If the negative result (judgment to determine that the data pattern is not valid) is obtained in step S104, the processing proceeds to the processing in step S105. Incidentally, if an affirmative result (judgment to determine that the data pattern is valid) is obtained in step S104, the processing proceeds to the processing in step S107.

(2-2-4) Reconstruction of Data Pattern

In step S105, the data pattern transformation processing unit 214 reconstructs the data pattern with reference to data pattern transformational rules 2100 stored in the data pattern transformational rules storage unit 109. Now, during the data pattern reconstruction processing, rejection processing for removing an exception pattern(s) having an exceptional characteristic, such as low occurrence frequency or an extremely different character pattern, from the data pattern is executed, as one of characteristic processing according to the second embodiment, after executing the transformation processing for transforming the data pattern by rewriting information of the data pattern.

Figure 21:
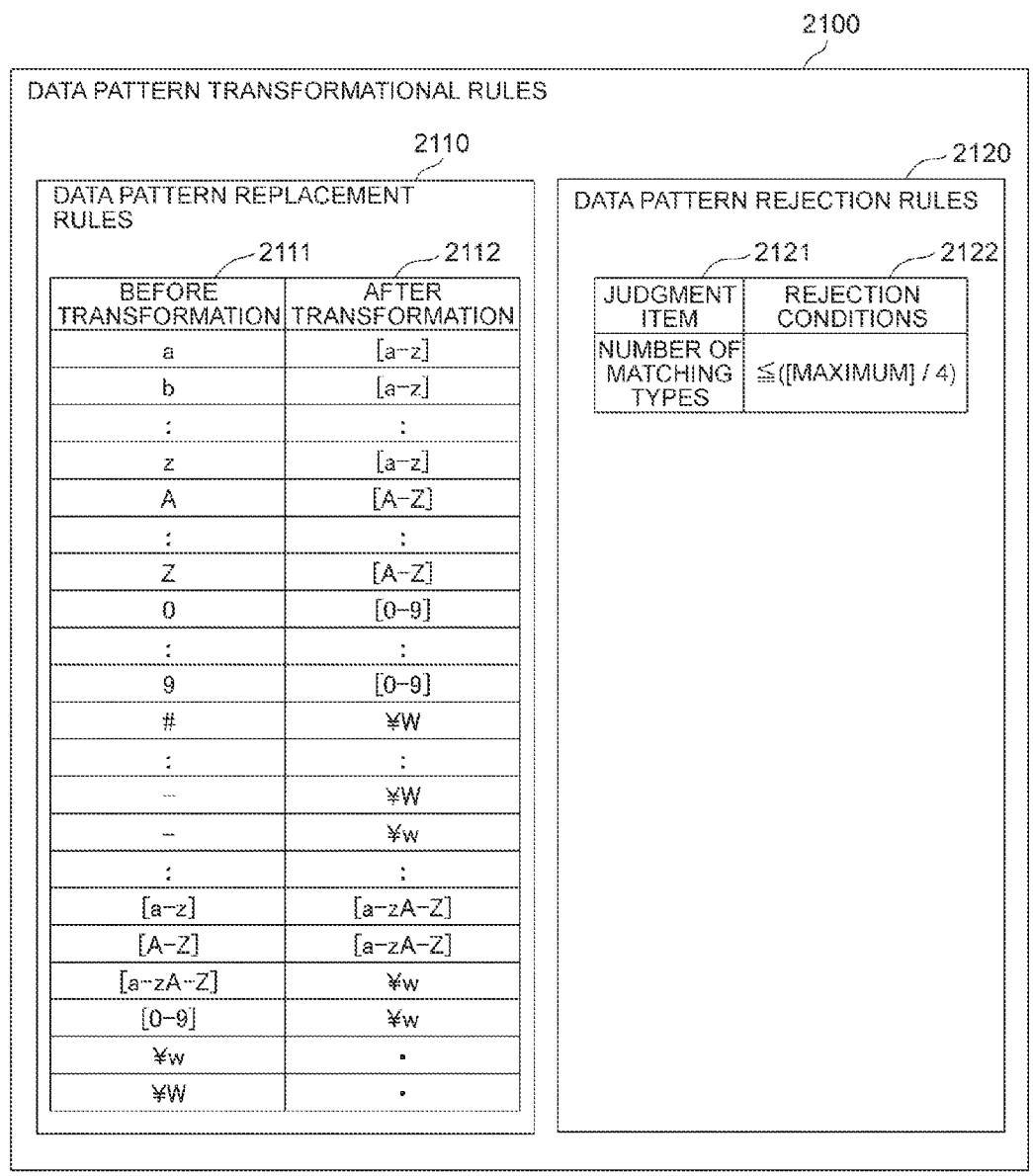
FIG. 21 is a table showing an example of data pattern transformational rules according to the second embodiment.

FIG. 21 is a table illustrating an example of the data pattern transformational rules according to the second embodiment. Data pattern transformational rules 2100 shown in FIG. 21 include data pattern replacement rules 2110 indicating rules for rewriting data pattern information (node values of nodes constituting the relevant data pattern) and data pattern rejection rules 2120 indicating rules for deciding an exceptional data pattern (exception pattern) to be removed from the data pattern and are stored in the data pattern transformational rules storage unit 109 in advance. The data pattern replacement rules 2110 correspond to the data pattern transformational rules 900 shown in FIG. 9 according to the first embodiment and is constituted from combinations of a "before transformation" column 2111 describing information (a node value), which is a target to be rewritten, and an "after transformation" column 2112 describing information (a node value) after rewriting the information. Moreover, the data pattern rejection rules 2120 are constituted from a combination of a judgment item column 2121 describing a judgment item of exceptional pattern information and a rejection condition column 2122 describing rejection conditions for the judgment item. For example, the rejection rule of the "number of matching types≤([Maximum]/4)" is set to the data pattern rejection rules 2120 and this means that "the number of matching types is equal to or less than one-quarter of a maximum of the number of matching types in the data pattern." Incidentally, "the number of matching types" means the number of types of data in each path of the data pattern.

Firstly, during the data pattern transformation processing, the data pattern transformation processing unit 214 rewrites the data pattern (the tree 1800) read from the data pattern storage unit 108 with reference to the data pattern transformational rules 2100, performs point rating of the data pattern after the transformation processing by means of specified processing by using the data pattern quantification processing unit 113, and decides the reconstructed pattern based on the point rating result. Since such processing is the same as the processing explained with reference to FIG. 10 to FIG. 13 in the first embodiment, its explanation has been omitted. The data pattern transformation processing unit 214 writes the decided "reconstructed data pattern" to the data pattern storage unit 108.

Subsequently, the data pattern transformation processing unit 214 judges whether the reconstructed data pattern satisfies the data pattern rejection rules 2120 or not; and if any pattern information that satisfies the data pattern rejection rules 2120 exists, rejection processing for removing such pattern information as an exception pattern from the data pattern is executed.

Figure 22:
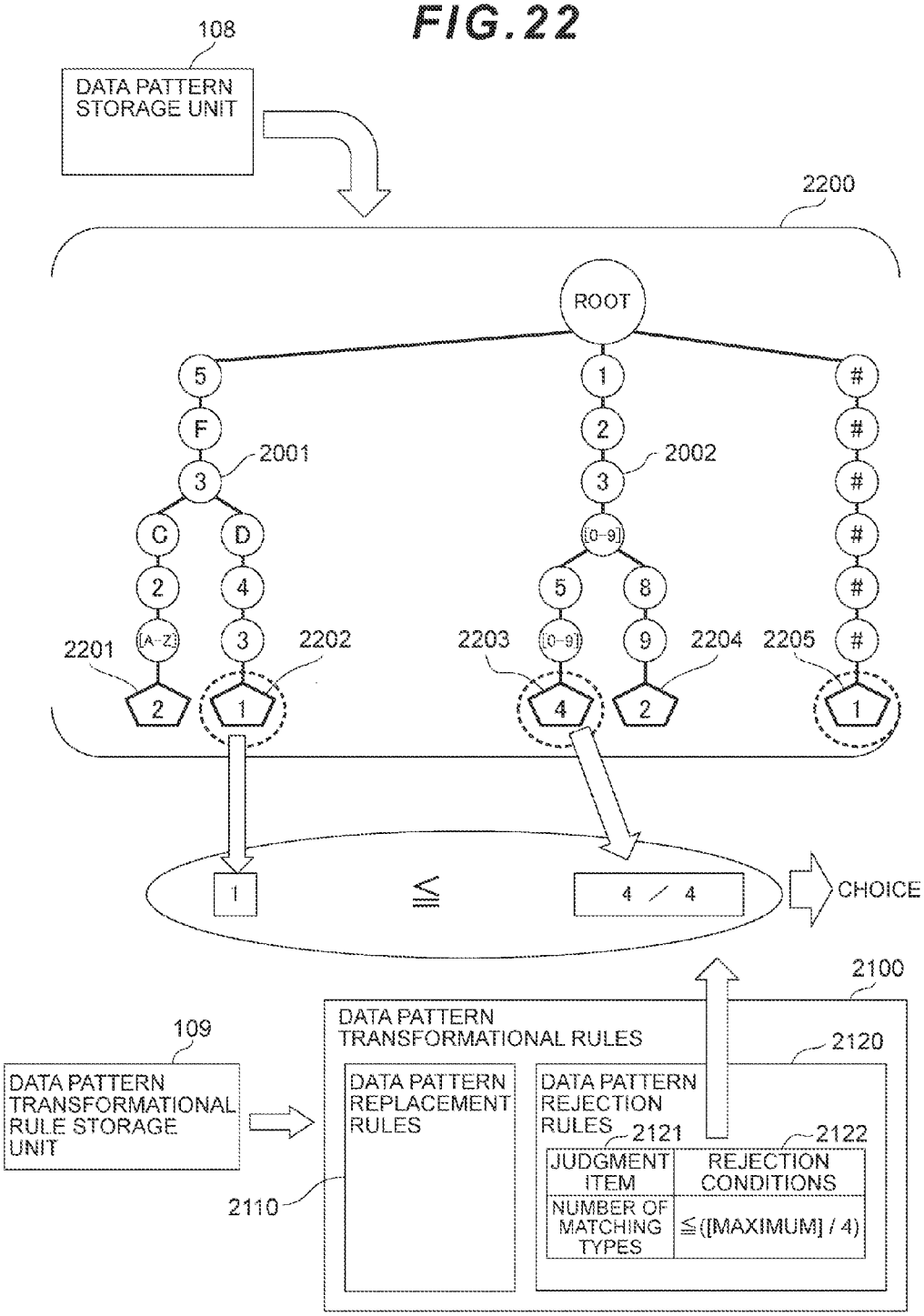
FIG. 22 is a schematic diagram for explaining exception pattern judgment processing based on data pattern rejection rules according to the second embodiment.

FIG. 22 is a schematic diagram for explaining the exception pattern judgment processing based on the data pattern rejection rules according to the second embodiment. A tree 2200 shown in FIG. 22 is a tree transformed by the data pattern transformation processing on the tree 1800 and decided as the reconstructed data pattern. According to the data pattern rejection rules 2120, the exception pattern judgment rule is set so that "the number of types of data for each path of the tree 2200 (the number of matching types) is equal to or less than one-quarter of the maximum value of the number of matching types in the data pattern." In this example, a node value of each leaf node 2201 to 2205 in the tree 2200 represents the number of types of data, so that reference is made to the node values of the nodes 2201 to 2205. As a result, the data pattern transformation processing unit 214 acquires the maximum value "4" from the node 2203 and judges whether or not a node having a node value equal to or less than one-quarter of the maximum value, that is, a node value equal to or less than "1" exists among the nodes 2201 to 2205. Referring to FIG. 22, the nodes 2202, 2205 have the node value "1" and fall under the above-described condition, so that path structures having the nodes 2202, 2205 as their leaves are selected as exception patterns.

Figure 23:
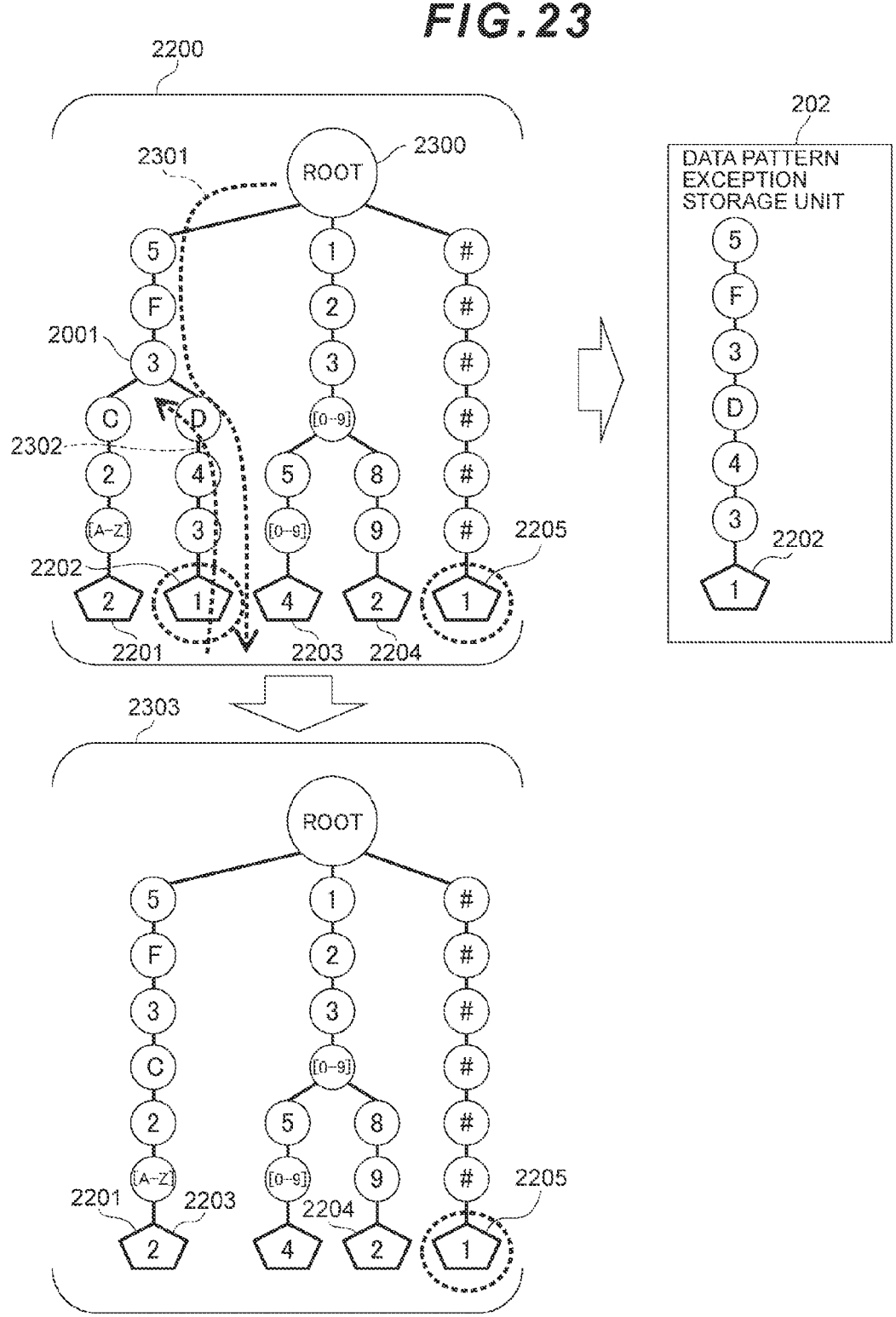
FIG. 23 is a schematic diagram for explaining exception pattern rejection processing according to the second embodiment.

Next, the data pattern transformation processing unit 214 removes a path structure(s) selected as the exception pattern(s) from the data pattern. FIG. 23 is a schematic diagram for explaining the exception pattern rejection processing according to the second embodiment. The data pattern transformation processing unit 214 finally selects one of path structures selected as the exception patterns. In this example, it is assumed that the path structure having the node 2202 as a leaf is selected. Next, the data pattern transformation processing unit 214 copies a sequence of a path 2301 extending from a node 2300, which is a root of a tree 2200, to the node 2202 which is the leaf of the path structure and adds it as the exception pattern to the data pattern exception storage unit 202. Furthermore, the data pattern transformation processing unit 214 removes a path 2302 from the node 2202 to an ancestor node 2001, which is closest to the node 2202 and has a plurality of children, from the tree 2200, thereby creating a tree 2303. Subsequently, with respect to a node 2205 in the same manner as in the case of the node 2202, the data pattern transformation processing unit 214 adds the exception pattern to the data pattern exception storage unit 202 and removes a path from the node 2205 to an ancestor node, which is closest to the node 2205 and has a plurality of children, from the tree 2303. The data pattern transformation processing unit 214 executes the same processing on all path structures selected as exception patterns, removes the exception patterns from the data pattern, and defines the tree, from which the exception patterns are removed, as a "finally reconstructed data pattern." For example, as a result of such rejection processing, the tree 2200 becomes a tree 2400 shown in FIG. 24 described later. This tree 2400 corresponds to a "finally reconstructed data pattern" and the data pattern transformation processing unit 214 writes the tree 2400 to the data pattern storage unit 108.

Next, in step S106, the data pattern transformation processing unit 214 judges whether the "finally reconstructed data pattern" can be transformed or not and if it is determined that the "finally reconstructed data pattern" can be transformed, the data pattern transformation processing unit 214 returns to the processing in step S103. If the "finally reconstructed data pattern" cannot be transformed or the "finally reconstructed data pattern" is completely identical to the data pattern before the reconstruction, the data pattern transformation processing unit 214 proceeds to the processing in step S107.

(2-2-5) Validity Evaluation of Finally Reconstructed Data Pattern

In step S103 after the processing in step S106, the data pattern judgment processing unit 112 evaluates validity of the "finally reconstructed data pattern."

Figure 24:
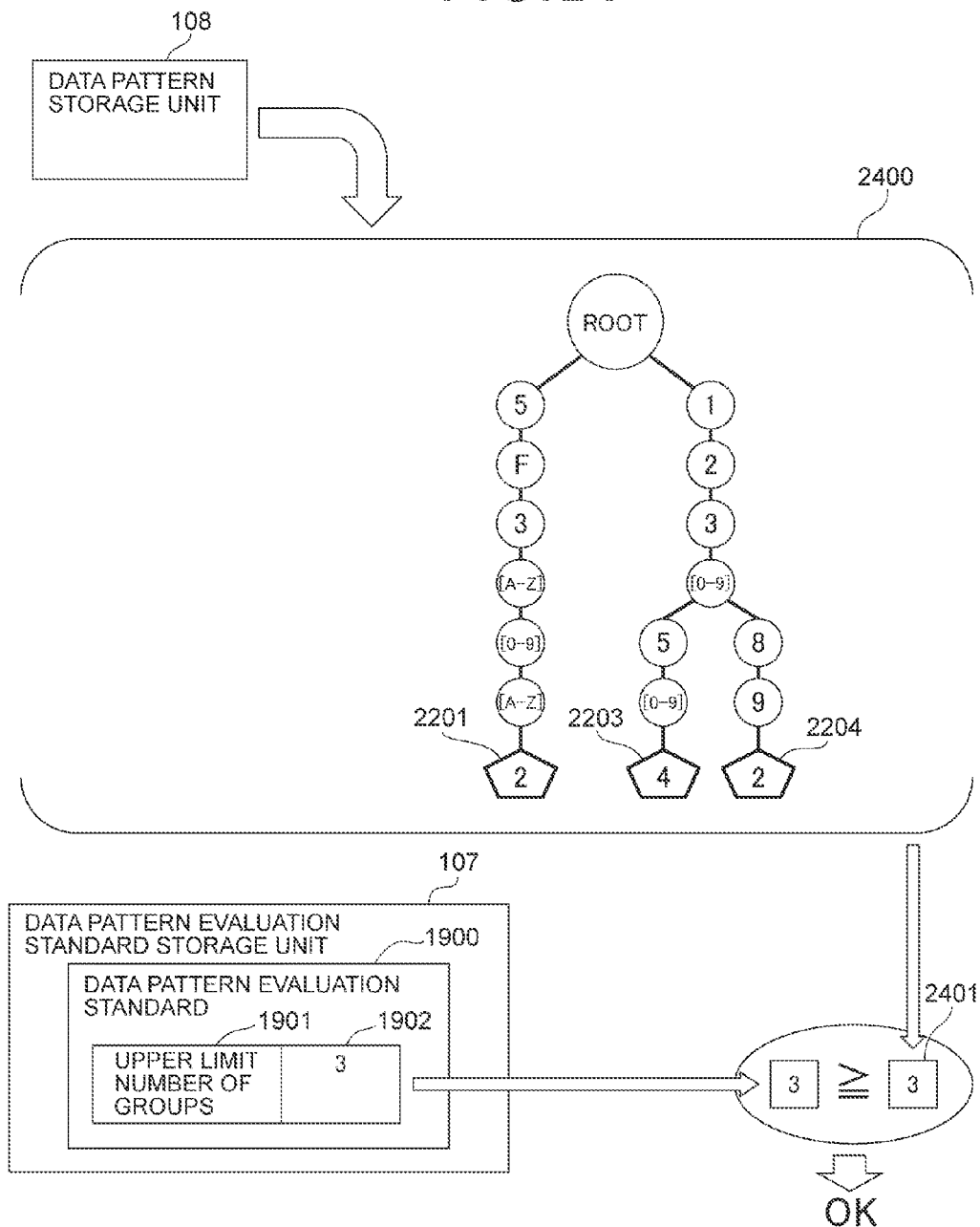
FIG. 24 is a schematic diagram for explaining processing for evaluating validity of a finally reconstructed data pattern according to the second embodiment.

FIG. 24 is a schematic diagram for explaining processing for evaluating the validity of the finally reconstructed data pattern according to the second embodiment. The validity evaluation of the finally reconstructed data pattern is performed by the data pattern judgment processing unit 112 in the same manner as the processing for evaluating the validity of the aforementioned initial data pattern. Specifically speaking, the data pattern judgment processing unit 112 reads the "finally reconstructed data pattern" retained in the data pattern storage unit 108, performs point rating by using the data pattern quantification processing unit 113, and judges the validity based on the point rating result and the data pattern evaluation standard 1900 retained in the data pattern evaluation standard storage unit 107 to the if the reconstructed data pattern satisfies the appropriate standards.

Referring to FIG. 24, the tree 2400 representing the reconstructed data pattern is point-rated as "3" which is the number of groups 2401. Since the number of groups 2401 satisfies the condition indicated by the data pattern evaluation standard 1900, that is, "the upper limit number of groups is 3 or less," the data pattern judgment processing unit 112 determines that the tree 2400 is valid, and then proceeds to the processing in step S107.

If the data pattern cannot satisfy the data pattern evaluation standard 1900 and a negative judgment is returned in step S103 in FIG. 2 as described above, the data pattern is reconstructed in step S104 and if the finally reconstructed data pattern can be transformed, the processing for performing the validity evaluation is repeated again in step S103. Then, if an affirmative judgment is returned as the result of the validity evaluation at whichever stage or if a negative judgment is returned as the result of the validity evaluation and then the data pattern is reconstructed, but the data pattern cannot be transformed any further (NO in step S106), the data pattern is output in step S107.

(2-2-6) Output of Data Pattern

In step S107, the data pattern visualization processing unit 215 reads a data pattern, which is stored last in the data pattern storage unit 108, converts it into a specified format easily visually recognizable by the user, and outputs it to the output device 104. Incidentally, the data pattern visualization processing unit 215, like the data pattern visualization processing unit 115, may convert the data pattern into a specified computer-readable format and output it. Moreover, the data pattern output method in step S107 may be decided as designated by the user as in the case of the first embodiment.

Figure 25:
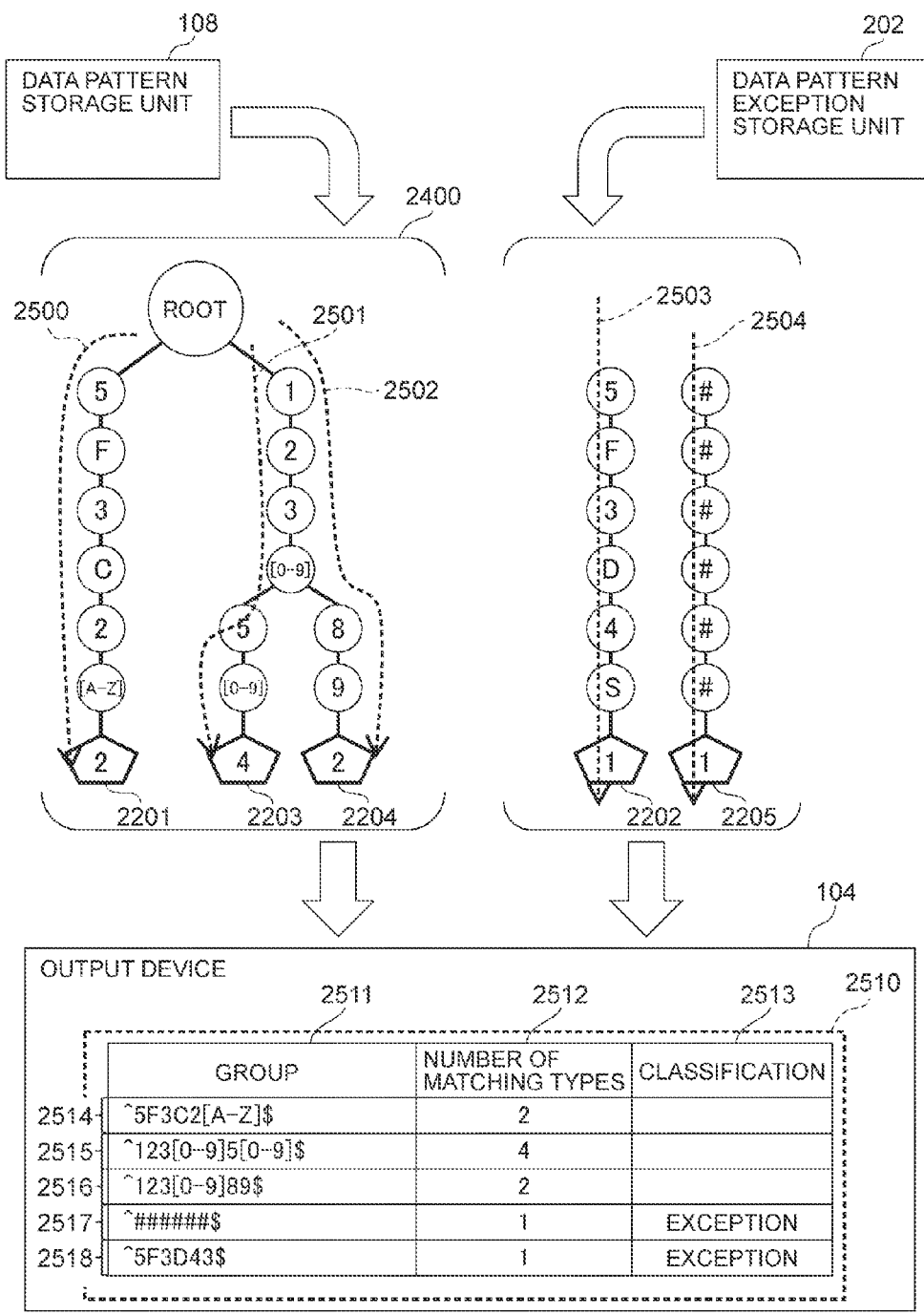
FIG. 25 is a schematic diagram for explaining an example of processing for outputting a data pattern according to the second embodiment.

FIG. 25 is a schematic diagram for explaining an example of processing for outputting a data pattern according to the second embodiment. FIG. 25 illustrates processing for aggregating and outputting data patterns to an output table 2510. The output table 2510 is constituted from a group 2511, which describes a path structure of a tree retained by the data pattern, the number of matching types 2512 which describes the number of types of data represented by the relevant path structure, and classification 2513 describing the classification of the relevant group. The description method of the group 2511 is the same as the group 1511 explained with reference to FIG. 15. Moreover, the number of types of data described in the number of matching types 2512 corresponds to node values of leaf nodes which are children of the relevant group and is for example, node values of nodes 2201, 2203, 2204 in the case of the tree 2400. Furthermore, if the relevant group corresponds to an exception pattern, the classification 2513 stores a description such as "Exception."

The data pattern visualization processing unit 215 firstly reads a data pattern which has been stored last from the data pattern storage unit 108. Therefore, if the "finally reconstructed data pattern" obtained by transforming the initial data pattern is stored, the tree 2400 corresponding to the "finally reconstructed data pattern" is read from the data pattern storage unit 108 as shown in FIG. 25. Next, the data pattern visualization processing unit 215 acquires paths 2500 to 2503 from their roots to leaves from the tree 2400 retained by the read data pattern. Then, the data pattern visualization processing unit 215 defines values of nodes other than the leaves included in the acquired paths 2500 to 2503 as values of the group 2511 in the output table 2510 and defines node values of the leaves as values of the number of matching types 2512 of the relevant group 2510. Then, in a case of output corresponding to the data pattern read from the data pattern storage unit 108, the data pattern visualization processing unit 215 does not store any description in the classification 2513.

Furthermore, the data pattern visualization processing unit 215 reads the exception pattern stored in the data pattern exception storage unit 202 and creates the output table 2510 in the same manner as for the data pattern read from the data pattern storage unit 108. Specifically speaking, the data pattern visualization processing unit 215 acquires paths 2503, 2504, defines node values other than leaves included in the paths 2503, 2504 as values of the group 2511, and defines node values of the leaves as values of the number of matching types 2512. Then, in a case of output corresponding to the exception pattern read from the data pattern exception storage unit 202, the data pattern visualization processing unit 215 stores the description "Exception" in the classification 2513.

As a result, as illustrated in FIG. 25, a row 2514 indicates that a group represented by a character string "5F3C2 [A-Z]" as part of the data pattern has "2" as the number of types of data. Moreover, a row 2517 indicates that a group represented by a character string "######" has "1" as the number of types of data and that group is an exception pattern; and the exception pattern of the row 2517 is an example of a pattern group whose character pattern is extremely different from other pattern groups. Moreover, a row 2518 indicates that a group represented by a character string "5F3D43" has "1" as the number of types of data and that group is an exception pattern; and the exception pattern of the row 2518 is an example of a pattern group with lower occurrence frequency than other pattern groups. Finally, the data pattern visualization processing unit 215 outputs the output table 2510 to the output device 104 in the output format designated by the user.

(2-3) Advantageous Effects of This Embodiment

Such a database analyzer 20 not only focuses attention on the designated table column, analyzes characteristics of data groups in the analysis target database based on data values in the same column, and performs grouping (classification) based on the characteristics of the data groups, but also creates and outputs a data pattern by removing a pattern group(s) having exceptional characteristics, such as a pattern group(s) with a smaller number of types of data than a specified standard, that is, a pattern group with lower occurrence frequency or an extremely different character pattern, as an exception pattern(s) from the data pattern. As a result, in addition to the advantageous effects of the database analyzer 10 according to the first embodiment, a data pattern in which more representative characteristics of data groups in the analysis target database are aggregated than in the case of the first embodiment can be provided to the user. Consequently, when the user creates test data based on the output result of the database analyzer 20, it is possible to contribute to the creation of the test data while recognizing the characteristics of the representative data.

Furthermore, such a database analyzer 20 also outputs the exception pattern(s), which has been removed from the data pattern, by being distinguished from the data pattern, so that the characteristics of the data groups can be provided in more detail to the user without undermining exhaustivity of the data groups in the analysis target database. Then, when the user creates test data based on the output result of the database analyzer 20, it is possible to create the test data which exhaustively covers the characteristics of the data groups in the database while being conscious of the occurrence frequency and tendencies of the character patterns by preparing test data corresponding to a pattern group(s), which is output as the exception pattern(s), in addition to test data corresponding to the data pattern.

Furthermore, such a database analyzer 20 reconstructs the data pattern while removing the exception pattern(s) during the database analysis processing, so that processing time required to reconstruct the data pattern is reduced and the advantageous effect of reducing the entire processing time required for the database analysis processing can be expected.

(3) Other Embodiments

Incidentally, the database analyzer 10, 20 according to the aforementioned first and second embodiments have been described about the case in which the database analyzer 10, 20 analyzes data groups stored in the database 30; however, the present invention is not limited to this example. For example, if a plurality of databases connected via the network 31 to the database analyzer 10, 20 exist, the database analyzer 10, 20 may be configured so that when the user performs the specified input operation to issue the instruction to start analyzing the database, a database which is to be an analysis target is designated and copy data of data groups stored in the database is input from the designated database to the database analyzer 10, 20.

Furthermore, with the database analyzer 10, 20 according to the aforementioned first and the second embodiments, the external storage apparatus 105, 201 is an example of the storage unit and the data pattern evaluation standard 700, 1900 is an example of a first judgment standard for judging the validity of the data pattern. Moreover, the data pattern transformational rules 900 or the data pattern replacement rules 2110 are an example of specified conversion rules for converting conceptually similar constituent elements into the same constituent element with respect to constituent elements of each group included in the data pattern. Also, the data pattern rejection rules 2120 are an example of a second judgment standard for the occurrence frequency or the data structure regarding each group included in the transformed data pattern in order to decide an exceptional group. Furthermore, the data pattern visualization processing unit 115 is an example of a first data pattern output processing unit for converting the data pattern, which has been stored last in the storage unit, into a specified format and outputting the transformed data pattern to the output device. Moreover, the data pattern visualization processing unit 215 is an example of a second data pattern output processing unit for transforming the data pattern stored last in the storage unit and all exception patterns stored in the storage unit into a specified format and outputting the transformed data pattern and the transformed exception patterns to the output device.

Incidentally, the present invention is not limited to the aforementioned embodiments, and includes various variations. For example, the aforementioned embodiments have been described in detail in order to explain the invention in an easily comprehensible manner and are not necessarily limited to those having all the configurations explained above. Furthermore, part of the configuration of a certain embodiment can be replaced with the configuration of another embodiment and the configuration of another embodiment can be added to the configuration of a certain embodiment. Also, the configuration of another configuration can be added to, deleted from, or replaced with, part of the configuration of each embodiment.

Furthermore, part or all of the aforementioned respective configurations, functions, processing units, processing means, and so on may be realized by hardware by, for example, designing them in integrated circuits. Also, each of the aforementioned configurations, functions, and so on may be realized by software by processors interpreting and executing programs for realizing each of the functions. Information such as programs, tables, and files for realizing each of the functions may be retained in memories, storage devices such as hard disks and SSDs (Solid State Drives), or storage media such as IC cards, SD cards, and DVDs.

Furthermore, only control lines and information lines that are considered to be necessary for explanation are indicated and not all control lines and information lines are necessarily indicated in terms of products. In practice, almost all components may be connected to each other.

REFERENCE SIGNS LIST

10, 20 database analyzer
101 CPU
102 memory
103 input device
104 output device
105, 201 external storage apparatus
106 data storage unit
108 data pattern storage unit
110 processing programs
111 data pattern creation processing unit
112 data pattern judgment processing unit
113 data pattern quantification processing unit
114, 214 data pattern transformation processing unit
115, 215 data pattern visualization processing unit
202 data pattern exception storage unit
30 database
31 network

The invention claimed is:

1. A database analyzer for analyzing a data group stored in an analysis target database by focusing attention on a designated table column in the data, the database analyzer comprising:

a storage unit storing data;

a data sorting unit for sorting a data group acquired from the analysis target database based on data values of the table column and storing it as analysis target data in the storage unit;

a data pattern creation processing unit for creating a group for each of the data values based on differences between the data values of the analysis target data and storing a data pattern, which is a collection of the groups, in the storage unit;

a data pattern judgment processing unit for judging validity of the data pattern stored in the storage unit based on a first judgment standard;

a data pattern transformation processing unit for transforming and reconstructing the data pattern and storing the reconstructed data pattern in the storage unit if a negative result is obtained for the validity judgment by the data pattern judgment processing unit;

wherein the data pattern transformation processing unit reconstructs the data pattern with respect to constituent elements of each group included in the data pattern by transforming each group in accordance with a specified conversion rule for converting the constituent elements into the same constituent element; and a data pattern quantification processing unit for performing point rating to judge adequacy of the data pattern according to a preset quantification method, wherein the data pattern judgment processing unit judges validity of the data pattern by comparing points, which are given to the data pattern by the data pattern quantification processing unit, with the first judgment standard.

2. A database analyzer for analyzing a data group stored in an analysis target database by focusing attention on a designated table column in the data, the database analyzer comprising:

a storage unit storing data;

a data sorting unit for sorting a data group acquired from the analysis target database based on data values of the table column and storing it as analysis target data in the storage unit;

a data pattern creation processing unit for creating a group for each of the data values based on differences between the data values of the analysis target data and storing a data pattern, which is a collection of the groups, in the storage unit;

a data pattern judgment processing unit for judging validity of the data pattern stored in the storage unit based on a first judgment standard; and a data pattern transformation processing unit for transforming and reconstructing the data pattern and storing the reconstructed data pattern in the storage unit if a negative result is obtained for the validity judgment by the data pattern judgment processing unit;

wherein the data pattern transformation processing unit reconstructs the data pattern with respect to constituent elements of each group included in the data pattern by transforming each group in accordance with a specified conversion rule for converting the constituent elements, into the same constituent element;

wherein in addition to the processing for transforming the data pattern, the data pattern transformation processing unit decides an exceptional group based on a second judgment standard relating to occurrence frequency or a data structure of each group with respect to groups included in a transformed data pattern, stores the decided exceptional group as an exception pattern in the storage unit, creates a data pattern from the transformed data pattern by removing the exception pattern, and stores the created data pattern as a reconstructed data pattern in the storage unit.

3. The database analyzer according to claim 2, wherein with respect to each group included in the data pattern, the second judgment standard includes values of constituent elements of the group or the number of types of data included in the group.

4. The database analyzer according to claim 2, further comprising an output device for outputting data; and
  a data pattern output processing unit for converting a data pattern stored last in the storage unit and all exception patterns stored in the storage unit into a specified format and having the output device output the transformed data pattern and the transformed exception patterns.

5. A database analysis method by a database analyzer for analyzing a data group stored in an analysis target database by focusing attention on a designated table column in the data,
  the database analyzer including a storage unit storing data,
  the database analysis method comprising:
    a data sorting step executed by the data base analyzer sorting a data group acquired from the analysis target database based on data values of the table column and storing it as analysis target data in the storage unit;
    a data pattern creation step executed by the data base analyzer creating a group for each of the data values based on differences between the data values of the analysis target data and storing a data pattern, which is a collection of the groups, in the storage unit;
    a data pattern judgment step executed by the data base analyzer judging validity of the data pattern stored in the storage unit based on a first judgment standard; and
    a data pattern reconstruction step executed, if a negative result is obtained for the validity judgment by the data pattern judgment step, by the data base analyzer reconstructing the data pattern with respect to constituent elements of each group included in the data pattern by transforming each group in accordance with a specified conversion rule for converting the constituent elements into the same constituent element and storing the reconstructed data pattern in the storage unit;
  wherein in the data pattern judgment step, the data base analyzer performs point rating to judge adequacy of the data pattern according to a preset quantification method and judges validity of the data pattern by comparing points, which are given to the data pattern by the point rating, with the first judgment standard.

6. A database analysis method by a database analyzer for analyzing a data group stored in an analysis target database by focusing attention on a designated table column in the data,
  the database analyzer including a storage unit storing data,
  the database analysis method comprising:
    a data sorting step executed by the data base analyzer sorting a data group acquired from the analysis target database based on data values of the table column and storing it as analysis target data in the storage unit;
    a data pattern creation step executed by the data base analyzer creating a group for each of the data values based on differences between the data values of the analysis target data and storing a data pattern, which is a collection of the groups, in the storage unit;
    a data pattern judgment step executed by the data base analyzer judging validity of the data pattern stored in the storage unit based on a first judgment standard; and
    a data pattern reconstruction step executed, if a negative result is obtained for the validity judgment by the data pattern judgment step, by the data base analyzer reconstructing the data pattern with respect to constituent elements of each group included in the data pattern by transforming each group in accordance with a specified conversion rule for converting the constituent elements into the same constituent element and storing the reconstructed data pattern in the storage unit;
  in the data pattern reconstruction step:
    an exception pattern decision step executed by the database analyzer deciding an exceptional group based on a second judgment standard relating to occurrence frequency or a data structure of each group with respect to groups included in the transformed data pattern after the processing for transforming the data pattern; and
    a rejection step executed by the database analyzer storing the exceptional group decided in the exception pattern decision step as an exception pattern in the storage unit and creating a data pattern by removing the exception pattern from the transformed data pattern;
  wherein the database analyzer stores the data pattern, which is created in the rejection step, as a reconstructed data pattern in the storage unit.

7. The database analysis method according to claim 6, wherein with respect to each group included in the data pattern, the second judgment standard includes values of constituent elements of the group or the number of types of data included in the group.

8. The database analysis method according to claim 6, wherein the data base analyzer includes an output device for outputting data; and
  the database analysis method further comprises a data pattern output step executed by the data base analyzer converting a data pattern stored last in the storage unit and all exception patterns stored in the storage unit into a specified format and having the output device output the transformed data pattern and the transformed exception patterns.

\* \* \* \* \*